(12) United States Patent
Kim et al.

(10) Patent No.: US 9,907,054 B2
(45) Date of Patent: Feb. 27, 2018

(54) METHOD AND DEVICE FOR SETTING OPERATING CHANNEL IN WHITE SPACE

(71) Applicant: LG Electronics Inc., Seoul (KR)

(72) Inventors: Bonghoe Kim, Gyeonggi-do (KR); Yunjung Yi, Gyeonggi-do (KR); Illsoo Sohn, Gyeonggi-do (KR); Eunsun Kim, Gyeonggi-do (KR); Byounghoon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 14/355,644

(22) PCT Filed: Nov. 6, 2012

(86) PCT No.: PCT/KR2012/009274
§ 371 (c)(1),
(2) Date: May 1, 2014

(87) PCT Pub. No.: WO2013/069944
PCT Pub. Date: May 16, 2013

(65) Prior Publication Data
US 2014/0254540 A1 Sep. 11, 2014

Related U.S. Application Data

(60) Provisional application No. 61/556,814, filed on Nov. 7, 2011.

(51) Int. Cl.
*H04W 72/02* (2009.01)
*H04W 84/12* (2009.01)
(Continued)

(52) U.S. Cl.
CPC ............ *H04W 72/02* (2013.01); *H04W 16/14* (2013.01); *H04W 72/0453* (2013.01); *H04W 84/12* (2013.01)

(58) Field of Classification Search
CPC .......... H04W 72/0446; H04W 72/042; H04W 16/14; H04W 4/00; H04W 72/0413; H04W 72/02; H04W 72/0453; H04W 84/12
See application file for complete search history.

(56) References Cited

U.S. PATENT DOCUMENTS 8,396,086 B1 * 3/2013 Gossett ................. H04W 74/08
370/236
8,787,282 B2 * 7/2014 Turtinen ............... H04L 5/0037
370/329

(Continued)

FOREIGN PATENT DOCUMENTS

KR 10-2011-0081939 A 7/2011
WO 2011/049314 A2 4/2011

OTHER PUBLICATIONS

Xiaojun Feng et al., "Database-assisted multi-AP network on TV white spaces: Architecture, spectrum allocation and AP discovery," New Frontiers in Dynamic Spectrum Access Networks (DySPAN), 2011 IEEE Symposium May 3-6, 2011, pp. 265-276.
(Continued)

*Primary Examiner* — Jung-Jen Liu
(74) *Attorney, Agent, or Firm* — Morgan, Lewis & Bockius LLP

(57) ABSTRACT

The present invention relates to a method of setting an operating channel for a second station STA by a first STA in a white space according to an embodiment of the present invention may include: obtaining information on available TV channels from a geographical database GDB; and transmitting, to the second STA, setting information on the operating channel determined based on the information on the available TV channel. If the minimum channel bandwidth supported by the operating channel is W MHz, the operating channel may be defined as one or more of a) a (Continued)

width of one W MHz channel, b) a width of two contiguous W MHz channels, c) a width of four contiguous W MHz channels, d) a width of two non-contiguous W MHz channels, or e) a channel width consisting of two non-contiguous frequency parts, each of which includes two contiguous W MHz channels.

12 Claims, 20 Drawing Sheets

(51) Int. Cl.
  *H04W 16/14* (2009.01)
  *H04W 72/04* (2009.01)

(56) References Cited

U.S. PATENT DOCUMENTS

| | | | | |
|---|---|---|---|---|
| 8,964,677 B2* | 2/2015 | Kim | ...................... | H04W 16/14 370/329 |
| 9,014,122 B2* | 4/2015 | Lee | ...................... | H04W 16/14 370/329 |
| 9,014,164 B2* | 4/2015 | Song | ...................... | H04W 16/14 370/343 |
| 2009/0196180 A1* | 8/2009 | Bahl | ...................... | H04L 5/0032 370/235 |
| 2010/0085921 A1* | 4/2010 | Wu | ...................... | H04L 27/2626 370/329 |
| 2010/0124254 A1* | 5/2010 | Wu | ...................... | H04L 5/003 375/131 |
| 2010/0195580 A1* | 8/2010 | Samarasooriya | ..... | H04W 16/14 370/329 |
| 2011/0158147 A1* | 6/2011 | Li | ...................... | H04W 72/082 370/312 |
| 2011/0287802 A1* | 11/2011 | Ma | ...................... | H04L 5/0066 455/517 |
| 2012/0052891 A1* | 3/2012 | Irnich | ................. | H04W 52/243 455/501 |
| 2012/0201213 A1* | 8/2012 | Banerjea | ........... | H04W 72/0453 370/329 |
| 2013/0329692 A1* | 12/2013 | Vrzic | ................ | H04W 72/0453 370/329 |
| 2014/0204854 A1* | 7/2014 | Freda | ...................... | H04L 1/18 370/329 |

OTHER PUBLICATIONS

David Gurney et al., "Geo-Location Database Techniques for Incumbent Protection in the TV White Space," New Frontiers in Dynamic Spectrum Access Networks, 2008 DySPAN, 3rd IEEE Symposium, Oct. 14-17, 2008, pp. 1-9.
International Search Report issued in corresponding International Patent Application No. PCT/KR2012/009274 dated Mar. 29, 2013.

* cited by examiner

These three fields are repeated, as determined by the Length field

| Map ID | Channel Number | Maximum Power Level | Valid Time (Optional) |
|---|---|---|---|

Octets:      1                1                      1                                1

FIG. 7
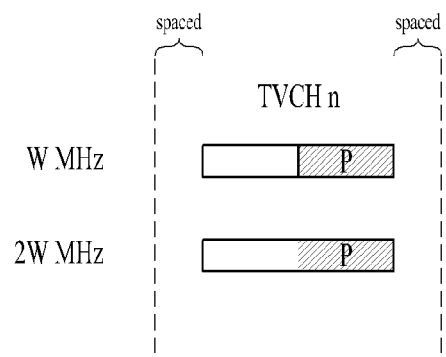
FIG. 8
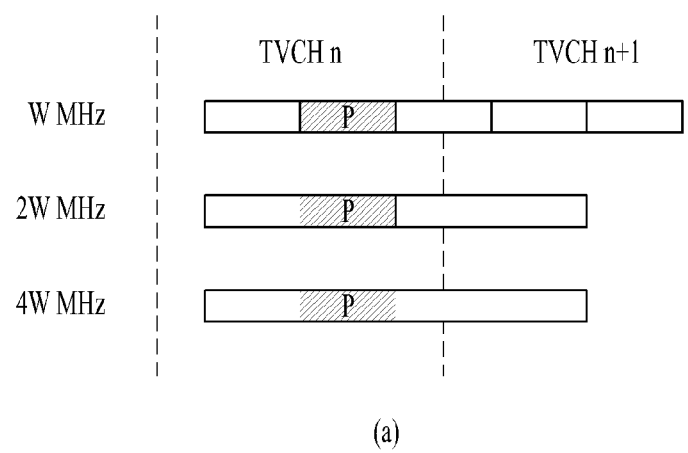
(a)
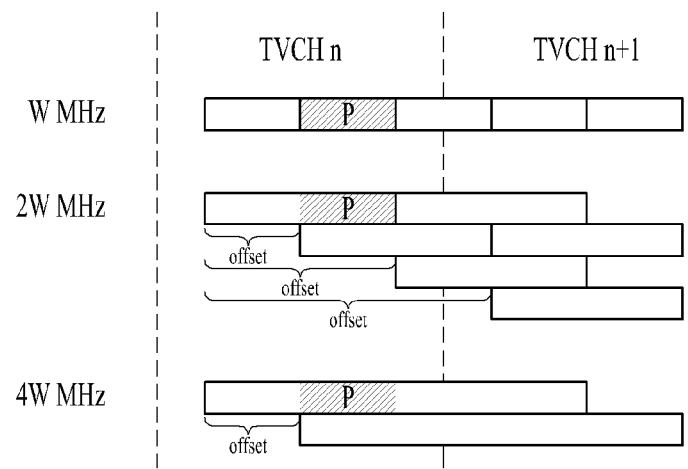
(b)

FIG. 22
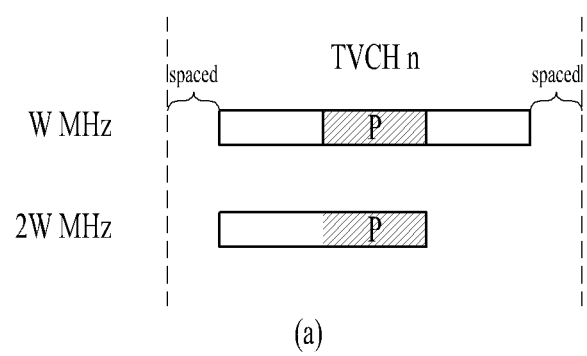
(a)
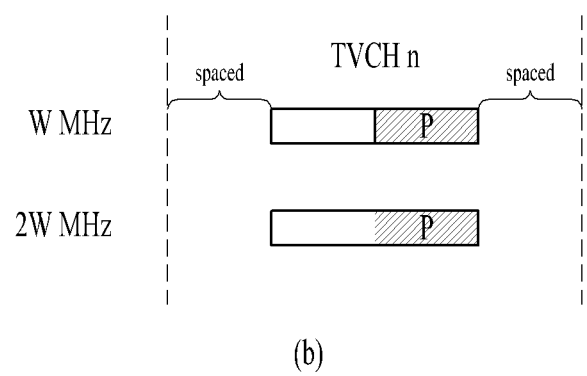
(b)

FIG. 23
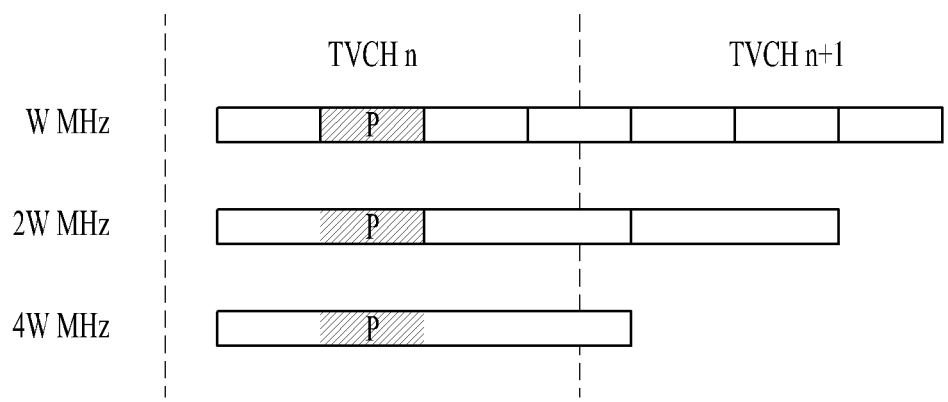
(a)
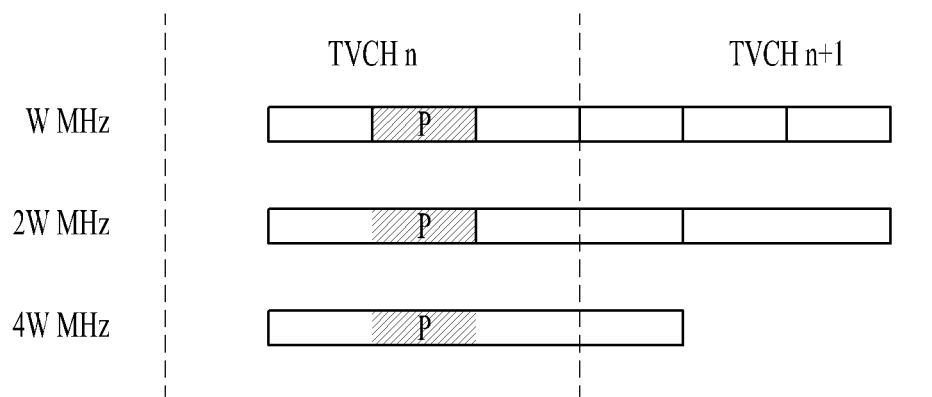
(b)

METHOD AND DEVICE FOR SETTING OPERATING CHANNEL IN WHITE SPACE

TECHNICAL FIELD

The present invention relates to a wireless communication system and, more particularly, to a method and apparatus for setting an operating channel in a white space band.

BACKGROUND ART

The standards for wireless local area network (WLAN) technologies are established by the Institute of Electrical and Electronics Engineers (IEEE) 802.11 standards committee. IEEE 802.11a and IEEE 802.11b respectively provide data rates of 54 Mbps and 11 Mbps using unlicensed bands of 2.4 GHz and 5 GHz. IEEE 802.11g adopts Orthogonal Frequency Divisional Multiplexing (OFDM) at 2.4 GHz and provides a data rate of 54 Mbps. IEEE 802.11n adopts Multiple Input Multiple Output (MIMO)-OFDM and provides a data rate of 300 Mbps for four spatial streams. IEEE 802.11n supports a channel bandwidth up to 40 MHz and provides a data rate of 600 Mbps.

The IEEE 802/11af standard for defining operations of unlicensed devices in the TV white space (TVWS) band is currently under development.

TVWS includes very high frequency (VHF) bands (54 to 60, 76 to 88, and 174 to 216 MHz) and an ultra high frequency (UHF) band (470 to 698 MHz) allocated for TV broadcast, and refers to a frequency band allowed to be used by unlicensed devices on condition that they do not disturb communication of licensed devices (devices for TV broadcast, wireless microphones, etc.) operating in the corresponding frequency band.

Although operations of all unlicensed devices are allowed in the range of 512 to 608 MHz and 614 to 698 MHz except for some special cases, 54 to 60 MHz, 76 to 88 MHz, 174 to 216 MHz, and 470 to 512 MHz are allowed for communication between fixed devices only. A fixed device refers to a device performing transmission at a fixed location only. In the following description, a white space band includes the above-described TVWS, but is not limited thereto.

An unlicensed device which desires to use a white space band should provide a function of protecting licensed devices. Accordingly, whether a licensed device occupies a white space band needs to be checked before starting transmission in the corresponding band. That is, the unlicensed device may be allowed to use the white space band only when the licensed device does not use the white space band.

To this end, the unlicensed device should access a geo-location database (GDB) through the Internet or a dedicated network to acquire information about a list of channels available in a corresponding area. The GDB stores and manages information about licensed devices registered therein and information about channels dynamically changed according to geographical locations of the licensed devices and time for which the licensed devices are used. To solve a problem of coexistence of unlicensed devices using the white space, a signaling protocol such as a common beacon frame and a spectrum sensing mechanism may be used.

In the IEEE 802.11 system, a TVWS device may refer to an unlicensed device operating in a TVWS spectrum using an IEEE 802.11 medium access control (MAC) layer and a physical (PHY) layer. In this specification, unless otherwise mentioned, a station (STA) refers to a TVWS device operating in a TVWS spectrum.

STA should provide a function of protecting an incumbent user or a primary user having access priority and including a licensed user (TV user, wireless microphone, etc.). That is, when an incumbent user is using TVWS, STA should stop using a corresponding channel. Accordingly, STA should detect an available channel that may be used by an unlicensed device (i.e., a channel not used by a licensed device) and operate in the available channel.

STA may detect an available channel by performing a spectrum sensing mechanism or by accessing a GDB to find out a TV channel schedule. Energy detection (a scheme for determining that an incumbent user is in use if the intensity of a received signal is equal to or higher than a certain value), feature detection (a scheme for determining that an incumbent user is in use if a digital TV preamble is detected), etc. may be used as the spectrum sensing mechanism. Then, the STA should access the GDB to acquire GDB information based on location information thereof to check whether a licensed device uses a channel in the location. GDB access and information acquisition should be performed a sufficient number of times to protect the licensed device.

Upon determining that an incumbent user is using a channel immediately next to a currently used channel through the spectrum sensing mechanism or GDB, a terminal (or STA) and a base station (or access point (AP)) may protect the incumbent user by reducing transmit power.

DISCLOSURE

Technical Problem

Available channels in a white space band may be non-contiguous in frequency. As such, the legacy WLAN channel structure may not be applied to the white space band without being changed. In addition, a channel available to a device operating in the white space band needs to be detected, and a channel structure for efficiently supporting the detection is required.

An object of the present invention devised to solve the problem lies in a method for efficiently setting a channel for wireless local area network (WLAN) operation in a white space band. Another object of the present invention devised to solve the problem lies in a method for accurately and efficiently providing information about an operating channel to a station (STA).

It is to be understood that both the foregoing general description and the following detailed description of the present invention are exemplary and explanatory and are intended to provide further explanation of the invention as claimed.

Technical Solution

The object of the present invention can be achieved by providing a method for setting an operating channel for a second station (STA) in a white space band by a first STA, the method including acquiring information about available TV channels from a geo-location database (GDB), and transmitting setting information of the operating channel, which is determined based on the information about the available TV channels, to the second STA, wherein, if a minimum channel bandwidth supported by the operating channel is W MHz, the operating channel is defined to have one or more channel widths among a) one W MHz channel width, b) two contiguous W MHz channel widths, c) four contiguous W MHz channel widths, d) two non-contiguous W MHz channel widths, and e) two non-contiguous frequency sections each including two contiguous W MHz channels.

In another aspect of the present invention, provided herein is a method for receiving setting information of an operating channel in a white space band from a first station (STA) by a second STA, the method including receiving the setting information of the operating channel, which is determined based on information about available TV channels, from the first STA, and determining a location of the operating channel based on the setting information of the operating channel, wherein, if a minimum channel bandwidth supported by the operating channel is W MHz, the operating channel is defined to have one or more channel widths among a) one W MHz channel width, b) two contiguous W MHz channel widths, c) four contiguous W MHz channel widths, d) two non-contiguous W MHz channel widths, and e) two non-contiguous frequency sections each including two contiguous W MHz channels.

In another aspect of the present invention, provided herein is a first station (STA) for setting an operating channel for a second STA in a white space band, the first STA including a transceiver configured to transmit signals to and receive signals from other devices, and a processor configured to control the first STA including the transceiver, wherein the processor is further configured to acquire information about available TV channels from a geo-location database (GDB), using the transceiver, and transmit setting information of the operating channel, which is determined based on the information about the available TV channels, using the transceiver to the second STA, and wherein, if a minimum channel bandwidth supported by the operating channel is W MHz, the operating channel is defined to have one or more channel widths among a) one W MHz channel width, b) two contiguous W MHz channel widths, c) four contiguous W MHz channel widths, d) two non-contiguous W MHz channel widths, and e) two non-contiguous frequency sections each including two contiguous W MHz channels.

In another aspect of the present invention, provided herein is a second station (STA) for receiving setting information of an operating channel in a white space band from a first STA, the second STA including a transceiver configured to transmit signals to and receive signals from other devices, and a processor configured to control the second STA including the transceiver, wherein the processor is further configured to receive the setting information of the operating channel, which is determined based on information about available TV channels, using the transceiver from the first STA, and determine a location of the operating channel based on the setting information of the operating channel, and wherein, if a minimum channel bandwidth supported by the operating channel is W MHz, the operating channel is defined to have one or more channel widths among a) one W MHz channel width, b) two contiguous W MHz channel widths, c) four contiguous W MHz channel widths, d) two non-contiguous W MHz channel widths, and e) two non-contiguous frequency sections each including two contiguous W MHz channels.

The operating channel may be defined at a location spaced apart from a channel start frequency by a predetermined frequency, and the setting information of the operating channel may include information about the predetermined frequency.

If the minimum channel bandwidth supported by the operating channel is W MHz, the predetermined frequency may be set as an integer multiple of W.

The channel start frequency may be a frequency of a first channel of the available TV channels.

One W MHz channel may be located at a center of one of the available TV channels.

The operating channel may be spaced apart from a boundary of the available TV channels by a band equal to or greater than a predetermined guard band.

A location of the operating channel may be defined by a location of a primary channel having a size of W MHz.

The primary channel for each of the operating channels having the channel widths of a) to e) may be set to the same frequency location.

Clear channel assessment (CCA) may be performed using the primary channel on each of the operating channel having the channel width of a) to e).

The first STA may be an enabling STA, and the second STA may be a dependent STA.

The operating channel may be defined as one or more of a) one W MHz channel on one available TV channel, b) two W MHz channels on two contiguous available TV channels, c) four W MHz channels on four contiguous available TV channels, d) two W MHz channels on two non-contiguous available TV channels, and e) two non-contiguous frequency sections each including two W MHz channels on two contiguous available TV channels.

It is to be understood that both the foregoing general description and the following detailed description of the present invention are exemplary and explanatory and are intended to provide further explanation of the invention as claimed.

Advantageous Effects

According to the present invention, a method for efficiently setting a channel for wireless local area network (WLAN) operation in a white space band may be provided. In addition, according to the present invention, a method for accurately and efficiently providing information about an operating channel to a station (STA) may be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIGS. 7 to 21 illustrate examples channelization according to the present invention in a case in which the bandwidth of TV channels is 6 MHz;

FIGS. 22 to 26 illustrate examples channelization according to the present invention in a case in which the bandwidth of TV channels is 8 MHz;

BEST MODE

Figure 1:
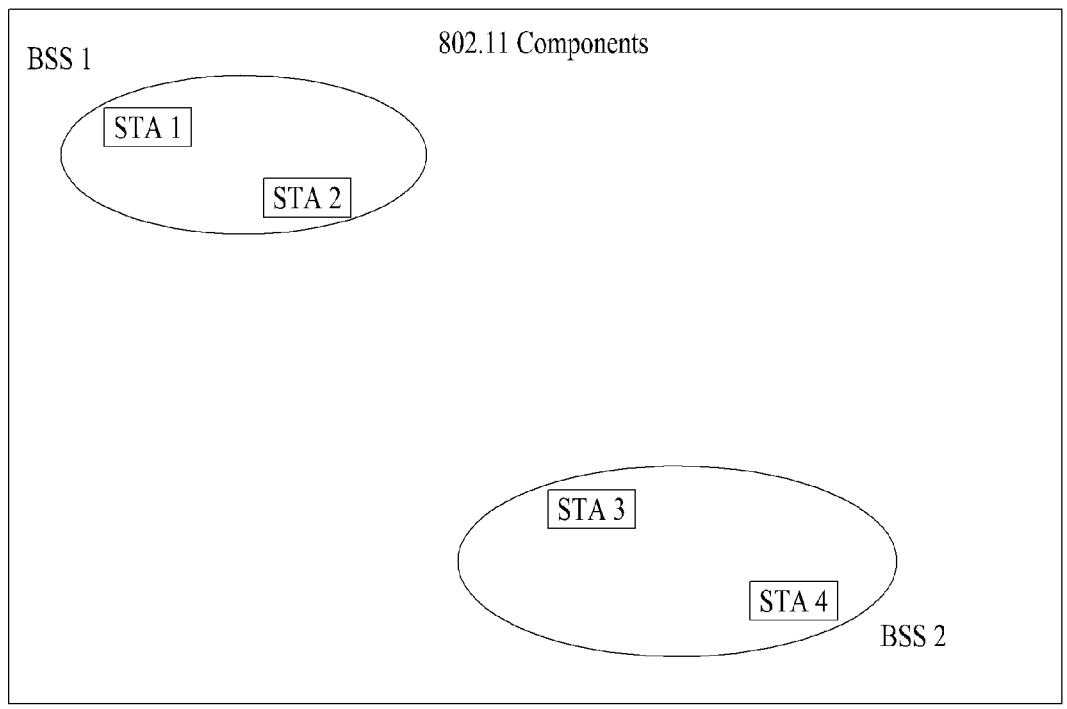
FIG. 1 illustrates an exemplary structure of the Electrical and Electronics Engineers (IEEE) 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

FIG. 1 illustrates an exemplary structure of the IEEE 802.11 system to which the present invention is applicable.

The IEEE 802.11 structure may be composed of a plurality of components and provide a WLAN supporting station (STA) mobility transparent for higher layers according to interaction of the components. A basic service set (BSS) may correspond to a basic component block in the IEEE 802.11 LAN. FIG. 1 exemplarily shows two BSSs (BSS1 and BSS2) each including two STAs as members (STA1 and STA2 are included in BSS1, and STA3 and STA4 are included in BSS2). In FIG. 1, an oval that defines a BSS may indicate a coverage area in which STAs belonging to the corresponding BSS perform communication. This area may be called a basic service area (BSA). When an STA moves out of the BSA, the STA may not directly communicate with other STAs in the BSA.

A basic BSS in the IEEE 802.11 LAN is an independent BSS (IBSS). For example, the IBSS may have a minimum configuration including only two STAs. The IBSS has a simplest form and corresponds to the BSS (BSS1 or BSS2) shown in FIG. 1, in which components other than STA are omitted. This configuration is possible when STAs may directly communicate with each other. This type of LAN may be configured as necessary rather than being previously designed and configured, and may be called an ad-hoc network.

When an STA is turned on or off, or enters or exits the coverage of a BSS, membership of the STA in the BSS may be dynamically changed. To become a member of the BSS, the STA may join the BSS using a synchronization procedure. To access all services based on the BSS, the STA should associate with the BSS. Association may be dynamically set and may use a distribution system service (DSS).

Figure 2:
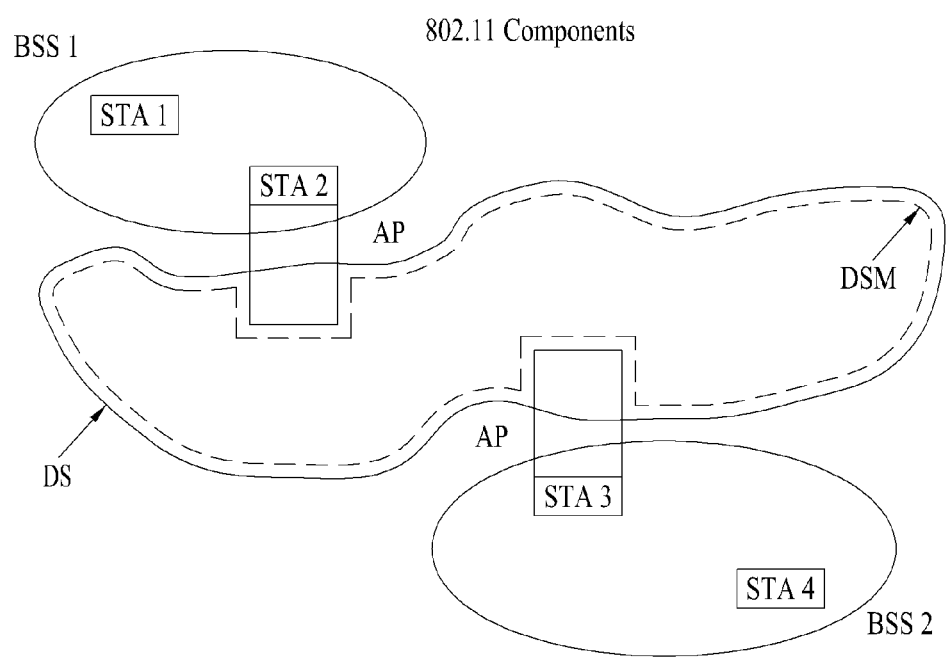
FIG. 2 illustrates another exemplary structure of the IEEE 802.11 system to which the present invention is applicable.

FIG. 2 illustrates another exemplary structure of the IEEE 802.11 system to which the present invention is applicable. FIG. 2 shows a distribution system (DS), a distribution system medium (DSM), and an access point (AP) in addition to the configuration of FIG. 1.

In a LAN, a direct station-to-station distance may be limited by PHY performance. Although this distance limit may be sufficient in some cases, communication between stations having a long distance therebetween may be needed in other cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other may explain flexibility of IEEE 802.11 LAN (DS structure or other network structures). That is, the IEEE 802.11 LAN may be implemented in various manners and physical characteristics of implementations may independently specify corresponding LAN structures.

The DS may support mobile devices by providing seamless integration of a plurality of BSSs and logical services necessary to handle addresses to a destination.

The AP refers to an entity that enables associated STAs to access the DS through a WM and has STA functionality. Data may be transmitted between a BSS and the DS through the AP. For example, STA2 and STA3 illustrated in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP may be received at an uncontrolled port at all times and processed by an IEEE 802.1x port access entity. Furthermore, the transmitted data (or frame) may be delivered to the DS when a controlled port is authenticated.

Figure 3:
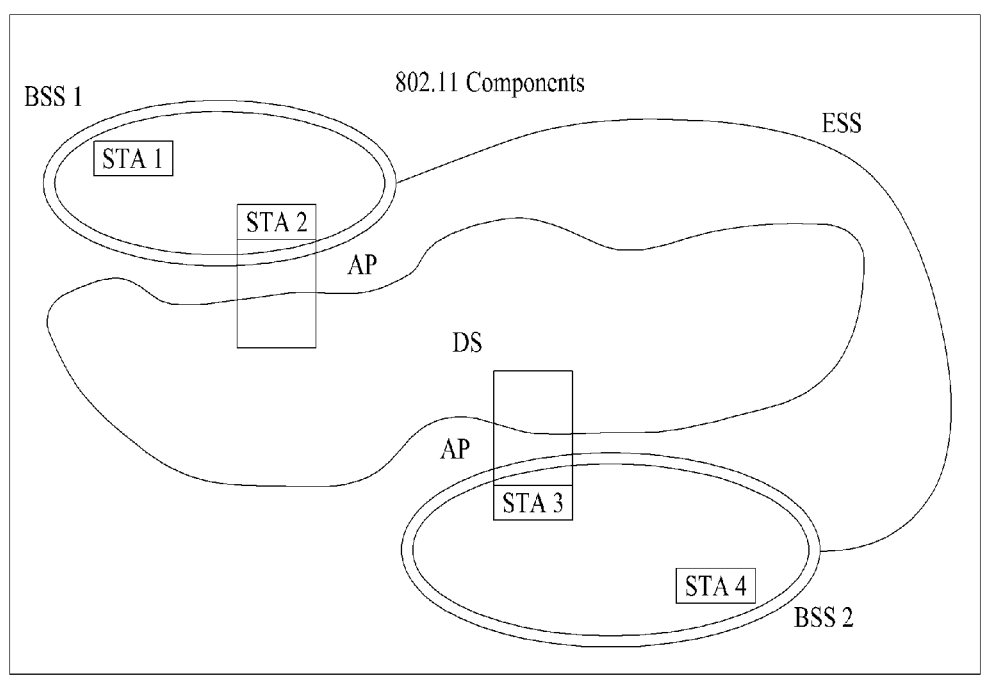
FIG. 3 illustrates another exemplary structure of the IEEE 802.11 system to which the present invention is applicable.

FIG. 3 illustrates another exemplary structure of the IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and an ESS. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS may communicate with each other and mobile STAs may move from a BSS to another BSS (in the same ESS) transparently to LCC.

IEEE 802.11 does not define relative physical locations of BSSs in FIG. 3 and the BSSs may be located as follows. The BSSs may partially overlap, which is a structure normally used to provide continuous coverage. The BSSs may not be physically connected to each other and there is no limit on the logical distance between the BSSs. In addition, the BSSs may be physically located at the same location in order to provide redundancy. Furthermore, one (or more) IBSS or ESS network(s) may be physically located in the same space as one (or more ESS) network(s). This may correspond to an ESS network form when an ad-hoc network operates in the location of the ESS network, IEEE 802.11 networks, which physically overlap, are configured by different organizations or two or more different access and security policies are needed at the same location.

Figure 4:
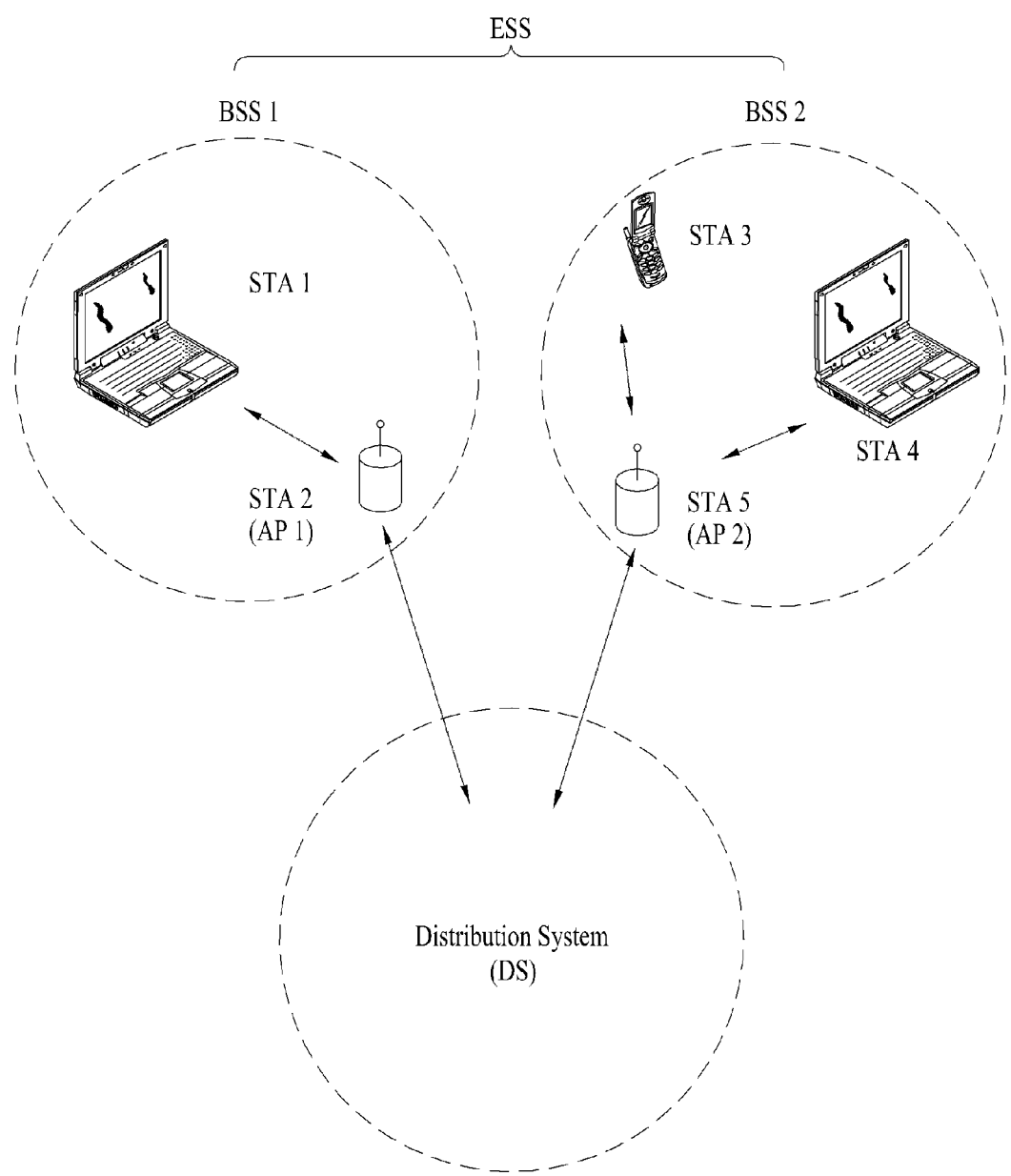
FIG. 4 illustrates an exemplary structure of the wireless local area network (WLAN) system.

FIG. 4 illustrates an exemplary structure of the WLAN system. FIG. 4 illustrates an example of a BSS based on a structure including a DS.

In FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In FIG. 4, STA1, STA3, and STA4 correspond to the non-AP STA, and STA2 and STA5 correspond to the AP STA.

In the following description, the non-AP STA may be called a terminal, wireless transmit/receive unit (WTRU), user equipment (UE), mobile station (MS), mobile terminal, mobile subscriber station (MSS), etc. The AP corresponds to a base station (BS), node-B, evolved node-B, base transceiver system (BTS), femto BS, etc. in other wireless communication fields.

Available Channel in White Space

For operation of an STA in white space, it is necessary to preferentially provide protection of a licensed device (or incumbent user). Accordingly, the STA should find an available channel that is not used by the licensed device and thus is usable by an unlicensed device, and operate on the available channel. If the channel used by the STA is no longer available, the STA should stop using the channel.

To check channel (e.g. TV channel) availability in the white space (e.g. TVWS), the STA may perform spectrum sensing or access a GDB to find out a TV channel schedule. GDB information may include information about a specific channel use schedule (i.e., channel use time) of the licensed device at a specific location. The STA which desires to check availability of a TV channel should access the GDB through the Internet to acquire GDB information based on location information thereof. This operation should be performed at an interval sufficient to protect the licensed device.

In this specification, information about available channels and frequencies, received from the GDB, is called a white space map (WSM). The WSM is a map of information about channels available for unlicensed devices in the TVWS based on channel and frequency information obtained by an STA from the GDB. The WSM may include information about a list of available channels or frequencies that may be used by unlicensed devices. Channels included in the available channel list are channels that are not used by signals (or users) that should be legally protected, and may be used by an unlicensed device when the unlicensed device accesses the GDB. When an unlicensed device requests an available channel after a certain lapse of time from when the unlicensed device accesses the GDB, the WSM may include information about channels and frequencies which are available from the corresponding time. Alternatively, when the unlicensed device requests an available channel to the GDB, it is possible to transmit information about available channels and frequencies by signaling channels that may not be used by the unlicensed device.

Federal Communications Commission (FCC) TVWS regulations currently define two device types. That is, a personal/portable device with low power, which is carried by a person, and a fixed device with high power, which operates at a fixed location, are defined. The fixed device may be referred to as a fixed STA and the personal/portable device may be referred to as a P/P STA. The fixed STA and P/P STA may correspond to normal STAs (that is, STAs including an AP and a non-AP) in the WLAN system. When the devices of two types operate in the TVWS, different operation rules may be applied thereto. The fixed device transmits/receives signal at a specific location that is not varied. The fixed device should access the GDB to acquire information about available channels to transmit a signal at the specific location. While the fixed device may include a positioning device such as a GPS, an installer may directly input the location of the fixed device to transmit the location information of the fixed device to the GDB. When the installer directly inputs the location of the fixed device, the fixed device is operated on the assumption that once the fixed device is installed and the location thereof is input, the location does not change. When the location of the fixed device is changed, the changed location should be registered. The fixed device may serve another fixed device of the same type and the P/P device. When the fixed device receives information about available channels from the GDB, the fixed device should transmit information about the device type thereof and receive information about available channels that may be directly used thereby. To serve the P/P device, the fixed device should additionally acquire information about available channels that may be used by the P/P device from the GDB or a proxy server connected to the GDB. This is because the fixed device and the P/P device use different channel intervals and operate with different maximum allowable transmit powers and different requirements for neighboring channels and thus the respective device types require different available channel lists. For example, the fixed device is allowed to transmit a signal at 512 to 608 MHz and 614 to 698 MHz as well as at 54 to 60 MHz, 76 to 88 MHz, 174 to 216 MHz and 470 to 512 MHz, whereas the P/P device is not allowed to transmit a signal in TVWS bands other than 512 to 608 MHz and 614 to 698 MHz. The fixed device may transmit a signal with higher power than the P/P device and up to 4 watts is allowed for the fixed device as effective isotropic radiated power (EIRP).

The P/P device may transmit/receive signals at a location that is not fixed and the location thereof may be changed. The P/P device may be carried by a person and mobility thereof may not be predicted. The available frequency band of the P/P device is 512 to 608 MHz and 614 to 698 MHz and maximum transmit power thereof is 100 mW (EIRP). That is, the allowable transmit power of the P/P device is limited compared to the fixed device.

The P/P device may be categorized into a mode II device and a mode I device according to whether or not the P/P device has identification capability, that is, geo-location capability and capability of accessing the GDB through the Internet. The mode II device has geo-location capability and GDB access capability and may access the GDB to acquire information about available channels at the location thereof and then operate in the TVWS at the corresponding location. In addition, the mode II device may acquire the available channel information from the GDB and then start communication through a network by transmitting a signal (e.g. enable signal) for instructing communication to be started to the mode I device. The mode I device need not have the geo-location capability or GDB access capability and operates under the control of the mode II device or a fixed device. The mode I device may acquire available channel information from the mode II device of fixed device and needs to periodically check validity of available channels. In addition, the mode I device may be allowed to operate on an available channel upon confirmation of the device ID thereof. Here, the mode II device or fixed device may correspond to an enabling STA and the mode I device may correspond to a dependent STA. An enabling signal transmitted from the enabling STA to the dependent STA may correspond to a beacon frame.

A P/P device corresponding to the mode II device may provide a service to another P/P device or fixed device. In this case, the mode II P/P device may acquire available channel information for the fixed device from the GDB and deliver the available channel information to the fixed device.

The GDB may calculate available channel information at a location requested by an unlicensed device and transmit the information to the unlicensed device in consideration of a channel use schedule and protection contour of an incumbent user such as a DTV or microphone. Parameters considered by the GDB when the GDB calculates the available channel information include a device type, operation location, transmit power and spectrum mask. In the FCC regulations, whether or not to use a neighboring channel depends on device type. For example, when a DTV receiver is used on channel #30, the fixed device may not use channels #29 and #31 even if channels #29 and #31 are not occupied but the P/P device may use the two channels. This is because the possibility that the fixed device interferes with a neighboring channel is high since the fixed device has high transmit power.

While exemplary embodiments of the present invention will be described hereinafter using TVWS as an exemplary white space for convenience, the scope of the present invention is not limited thereto. That is, the scope of the present invention includes exemplary embodiments of the present invention, which are applied to operations in all white spaces controlled by a DB that provides information about available channels at a specific location. For example, it is expected to allow operation of an unlicensed device, controlled by a GDB, in frequency bands that do not currently correspond to the white space but are expected to become white space and exemplary embodiments of the present invention applied thereto may be included within the scope of the present invention. Furthermore, while the principle of the present invention is described on the basis of FCC regulations for the TVWS, the scope of the present invention is not limited to operations in white space according to the FCC regulations and includes exemplary embodiments of the present invention, which are implemented on white spaces conforming to other regulations.

Available Channel Information Acquisition of Mode I Device

A description will be given of an exemplary procedure in which a mode I device operating in white space acquires available channel information from a mode II device or a fixed device.

Figures 5, 6:
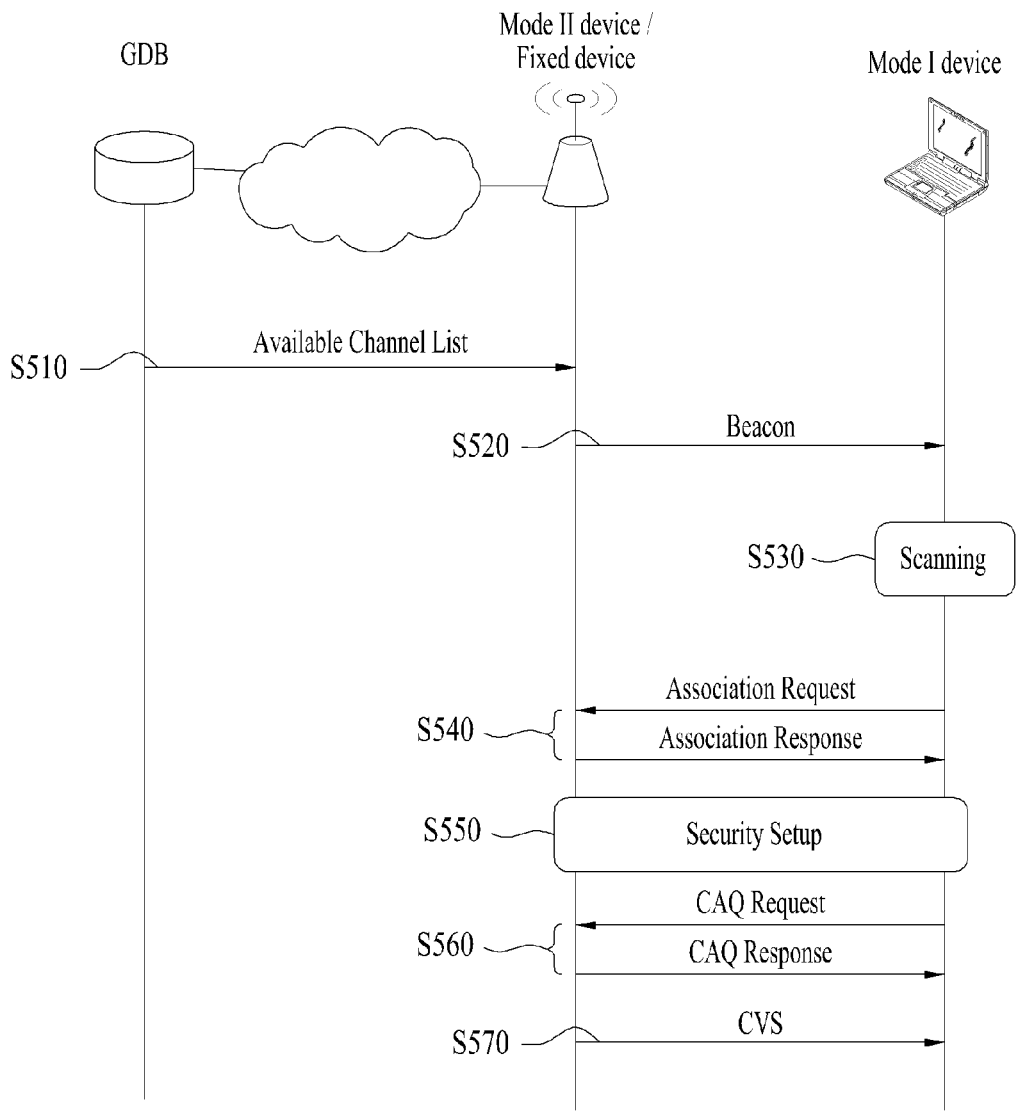
FIG. 5 is a flowchart of a link setup procedure according to an embodiment of the present invention.
FIG. 6 illustrates an example of a white space map (WSM)

FIG. 5 is a flowchart of a link setup procedure according to an embodiment of the present invention.

The mode II device or fixed device (hereinafter referred to as mode II device/fixed device) may access the GDB through the Internet or the like to acquire a list of available channels (e.g. WSM) that may be used in the current location thereof in step S510.

The mode II device/fixed device may transmit a beacon frame to configure a BSS in step S520. The beacon frame may include information about the available channel list, etc. The beacon frame may be periodically transmitted.

A mode I device which desires to participate in the BSS may scan the TVWS in step S530. If the mode I device knows the available channel list that may be used at the current location thereof, the mode I device may perform passive or active scanning only on channels belonging to the available channel list. Passive scanning refers to a procedure in which the mode I device listens for transmission of the beacon frame from the mode II device/fixed device on a scanning channel. Active scanning refers to a procedure in which the mode I device transmits a probe request frame and receives a probe response frame from the mode II device/fixed device on the scanning channel.

To participate in the BSS, the mode I device should operate under the control of the mode II device/fixed device. Accordingly, the mode I device should perform link setup with the mode II device/fixed device.

The mode I device may perform association after the scanning procedure in order to participate in the BSS in step S540. To this end, the mode I device may transmit an association request frame to the mode II device/fixed device.

Upon successful association request/response, security setup is performed in step S550. For example, security setup may include a private key setup procedure through 4-way handshaking using an extensible authentication protocol over LAN (EAPOL) frame. Security setup must be performed between the mode II device/fixed device and the mode I device because integrity check is required when the mode II device/fixed device transmits a WSM to the mode I device.

Upon completion of security setup, the mode I device may request the mode II device/fixed device to provide an available channel list (e.g. WSM) by transmitting a channel availability request frame (or channel availability query (CAQ) request frame) to the mode II device/fixed device in step S560. The mode II device/fixed device may provide the available channel list (e.g. WSM) to the mode I device by transmitting a channel availability response frame (or CAQ response frame) to the mode I device. The mode I device may complete link setup with the mode II device/fixed device by receiving the available channel list (e.g. WSM) from the mode II device/fixed device. Upon completion of link setup, the mode I device may start transmission/reception of data, control, and management frames, etc. to/from the mode II device/fixed device.

FIG. 6 illustrates an example of a WSM.

A map ID field indicates an ID of an available channel list. A channel number field indicates a channel number available to a TVWS device. The channel number may be referred to as a TV channel number, a spectrum range, etc., and is information for specifying an available channel in the frequency domain. A maximum power level field indicates maximum transmit power of the TVWS device on the available channel. A valid time field indicates a period of time for constantly using the available channel. The valid time field may be optional, not mandatory. The format of the WSM in FIG. 6 is merely an example, and another type of WSM including information about an available channel may be applied to embodiments of the present invention.

After link setup, as indicated by step S570, the mode I device may periodically receive a contact verification signal (CVS) from the mode II device/fixed device. The CVS may function to validly maintain the link setup state. The CVS may include a map ID of the WSM of the mode II device/fixed device. As such, the mode I device may periodically check the currently valid channel, and determine a WSM not indicated by the map ID of CVS, as not valid. That is, when the mode I device receives a CVS frame, if the CVS frame has a map ID different from the map ID of the WSM of the mode I device, the mode I device may transmit a CAQ request frame to the mode II device/fixed device to request a new available channel list (e.g., WSM).

TVWS Channelization

A channel for a communication system (e.g., WLAN) operating in TVWS (hereinafter referred to as an operating channel to distinguish it from a TV channel). TV channels available to a TVWS device may vary depending on the location of the device, etc. Particularly, to appropriately support operation of the TVWS device even when TV channels which are contiguous in frequencies are not available, a scheme for configuring a contiguous or non-contiguous operating channel may be considered.

In the present invention, the bandwidth of a basic unit for forming an operating channel is expressed as W MHz. The basic unit for forming the operating channel may be referred to as a frequency segment. The bandwidth of an operating channel in TVWS may be defined in a contiguous form, for example, W, 2 W, 4 W, 8 W, etc., or in a non-contiguous form, for example, W+W, 2 W+2 W, etc. This information about an operating channel width may be defined using an operation information element.

For example, when W=2, an operating channel formed of one frequency segment (i.e., 2 MHz channel), an operating channel formed of two contiguous frequency segments (i.e., 4 MHz channel), an operating channel formed of four contiguous frequency segments (i.e., 8 MHz channel), an operating channel formed of eight contiguous frequency segments (i.e., 16 MHz channel), etc. may be defined. An operating channel formed of two non-contiguous frequency segments (i.e., 2 MHz+2 MHz channel) includes two non-contiguous frequency sections each of which may form an operating channel including contiguous frequency segments (i.e., 4 MHz+4 MHz channel). However, W=2 is merely an example and the scope of the present invention includes examples of frequency segments including different bandwidths.

In the following description, a primary channel refers to a common operating channel for all STAs included in a BSS. That is, the primary channel corresponds to a basic channel for operation of STA. On the other hand, a secondary channel is a channel associated with the primary channel, and is a channel to be added to the primary channel to support a wider bandwidth and a higher throughput. For example, if a 4 MHz channel includes two 2 MHz channels, the location of a primary channel therebetween should be determined. The location of the primary channel may indicate a high frequency section or a low frequency section between the two 2 MHz channels. In the present invention, the primary channel is characterized as being defined in TVWS in which available TV channels vary depending on time or the location of STA. Specifically, in the configuration of a TVWS operating channel according to the present invention, a primary channel may be defined in consideration of available TV channels in TVWS.

Definition (i.e., channelization) of an operating channel for a system operating in TVWS may be determined based on available TV channels (i.e., TV channels for which no incumbent user exists). For example, when contiguous TV channels are not available (e.g., when TV channel n is available but TV channels n−1 and n+1 are not available) or when contiguous TV channels are available, channelization for a TVWS system may be determined in consideration of how many contiguous TV channels are available.

Setting information of an operating channel determined based on available TV channels may be provided from an enabling STA to a dependent STA. For example, the setting information of the operating channel may include a channel start frequency, a channel width, a channel center frequency index (a center frequency index of a frequency segment including a primary channel and a center frequency index of a frequency segment not including a primary channel), a primary channel location, etc. Here, the channel start frequency may be defined by operating class information. The channel width (e.g. W, 2 W, 4 W, W+W, 2 W+2 W, etc.) may be defined by operating channel information elements. The channel center frequency index and the primary channel location may be defined by a physical layer management entity management information base (PLME MIB).

The bandwidth of TV channels varies depending on countries. The United States and Korea define TV channels on 6 MHz basis, and Europe defines TV channels on 8 MHz basis. Descriptions are now given of embodiments of the present invention with respect to channelization in a case in which the bandwidth of TV channels is 6 MHz and in a case in which the bandwidth of TV channels is 8 MHz.

Embodiment 1

Embodiment 1 relates to a channelization scheme in TVWS in a case in which the bandwidth of TV channels is 6 MHz.

Embodiment 1-1

Embodiment 1-1 relates to a case in which a minimum operating channel bandwidth W=2 MHz.

FIG. 7 illustrates an example of channelization according to the present invention in a case in which one TV channel is available. FIG. 7 assumes that only one TV channel, e.g., TV channel n is available. FIG. 7 exemplarily shows a case in which an operating channel is formed as W MHz or 2 W MHz (e.g., 2 MHz or 4 MHz).

FIG. 7 illustrates an example of two contiguous W MHz channels and an example of one 2 W MHz channel. These examples may be understood as a universal set of operating channels available to a system when only TV channel n is an available channel. The set of all operating channels means a set of operating channels in all cases supported by the system in consideration of available TV channels. A channel actually used by a device operating in TVWS may be some or all elements selected from the set of all operating channels.

In FIG. 7, a start frequency of an operating channel may be defined as having a start frequency of TV channel n and a guard band of x MHz. For example, the above guard band needs to be defined to prevent TV channel n−1 from being used by an incumbent user or interfered by the incumbent user due to transmit power of a TVWS device. If TV channel n+1 is not an available channel in FIG. 7, the operating channel may be defined as further having a guard band of 1 MHz with respect to an end frequency of TV channel n. However, the present invention is not limited the size of guard band and a guard band of x=0.5 MHz, 1 MHz, 2 MHz, etc. may be defined depending on system requirements.

In FIG. 7, P denotes a primary channel. One of channels having a minimum channel bandwidth (2 MHz in the current embodiment) may be defined as the primary channel. A channel having a bandwidth greater than the minimum channel bandwidth may be defined to include the primary channel. That is, FIG. 7 shows that one of two W MHz channels, which corresponds to a high frequency section, is defined as a primary channel. Furthermore, in FIG. 7, one 2 W MHz channel is defined to include a primary channel at the same location as the primary channel defined for the W MHz channels.

In the present invention, since primary channels for operating channels having different bandwidths are defined at the same location, whether the corresponding channel is used may be detected efficiently. For example, whether a channel is used may be detected through clear channel assessment (CCA). Since whether a channel having various bandwidths and including one primary channel is available may be detected by performing CCA on the primary channel, overheads caused to detect whether each bandwidth channel is used may be reduced. Specifically, as will be described below, with respect to various-bandwidth operating channels (e.g., a) one W MHz channel width, b) two contiguous W MHz channel widths, c) four contiguous W MHz channel widths, d) two non-contiguous W MHz channel widths, and e) a channel width having two non-contiguous frequency sections each including two contiguous W MHz channels) proposed by the present invention, CCA may be performed using primary channels located at the same location and having a size of W MHz.

FIG. 8 illustrates an example of channelization according to the present invention in a case in which two contiguous TV channels are available. For example, it is assumed that TV channels n and n+1 are available. In this case, operating channels having sizes of W MHz, 2 W MHz, and 4 W MHz may be formed.

As illustrated in FIG. 8(a), five W MHz channels, two 2 W MHz channels, and one 4 W MHz channel may be defined.

In FIG. 8(a), a guard band may be applied as described above in relation to FIG. 7. That is, TV channel n−1 and/or TV channel n+2 may not be available TV channels. In this case, to protect an incumbent user, a universal set of operating channels may have a start frequency of TV channel n or an end frequency of TV channel n+1, and a guard band of x MHz. Although a guard band is not separately illustrated in FIG. 8 for clarity, this does not mean to exclude application of the guard band.

In addition, if primary channels are located at the same location in the W MHz, 2 W MHz, and 4 W MHz channels as illustrated in FIG. 8(a), CCA may be performed efficiently.

FIG. 8(b) illustrates an additional channelization scheme with respect to FIG. 8(a). In FIG. 8(b), a start point of an operating channel for a 2 W MHz channel may be offset by W from the start point of the 2 W MHz channel of FIG. 8(a). Alternatively, a certain offset value may be applied based on a start frequency of available TV channels. In this case, the offset value may be set to a value including a guard band. A universal set of 2 W MHz channels includes 2 W MHz channels to which various offsets are applied, as illustrated in FIG. 8(b).

Similarly, in FIG. 8(b), a start point of an operating channel for a 4 W MHz channel may be offset by W from the start point of the 4 W MHz channel of FIG. 8(a). Alternatively, a certain offset value may be applied based on the start frequency of the available TV channels. That is, a universal set of 4 W MHz channels includes 4 W MHz channels to which various offsets are applied, as illustrated in FIG. 8(b).

As such, a universal set of operating channels with respect to a certain bandwidth may be allowed to include overlapping channels. That is, in consideration of a start location of available TV channels, elements included in a universal set of 2 W MHz channels defined by the present invention may have partially overlapping bands. Here, the scope of the present invention is not limited to a specific offset value, and includes various channelization schemes in which appropriate offsets are applied while a guard band of the available TV channels is maintained.

In the exemplary 2 W MHz channels of FIG. 8(b), the offset value may be expressed as an integer multiple of W. That is, an offset of W, 2 W, 3 W, . . . may be applied based on a start frequency of the 2 W MHz channels of FIG. 8(a) (i.e., start frequency of all operating channels).

To more efficiently use frequency resources corresponding to the available TV channels, the offset value may be set tightly compared to a basic unit. For example, an offset value of 1 MHz, 2 MHz, 3 MHz, 4 MHz, . . . may be applied based on the start frequency of the available TV channels (or boundary of the available TV channels).

The offset defined in the present invention may be expressed as a change in the start location of the available TV channels. That is, in the example of the 2 W MHz channel of FIG. 8(b), when an offset of 3 W is applied based on the 2 W MHz channel of FIG. 8(a), it may be expressed as a change in the start location of the available TV channels. That is, when TV channels n and n+1 are available, an operating channel of 2 W MHz may have a start location of TV channel n+1 instead of TV channel n.

Exemplary channelization schemes in which an offset is applied in the following description of the present invention include examples of an offset defined based on a start frequency of available TV channels, and examples of an offset defined as a change in the start location of available TV channels, and repeated descriptions thereof are not provided here.

Figure 9:
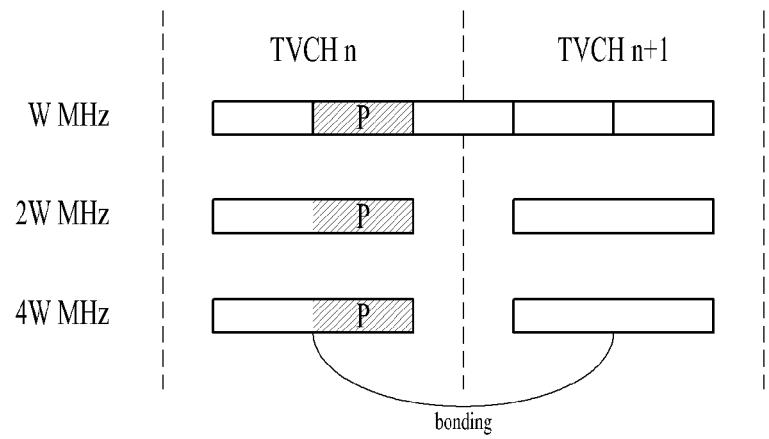

FIG. 9 illustrates another example of channelization according to the present invention in a case in which two contiguous TV channels are available. For example, it is assumed that TV channels n and n+1 are available. In this case, operating channels having sizes of W MHz, 2 W MHz, and 4 W MHz may be formed. As illustrated in FIG. 9, five W MHz channels, two 2 W MHz channels, and one 4 W MHz channel may be defined.

The W MHz channels may be channelized as described above in relation to FIG. 8 and thus repeated descriptions thereof are not provided here.

The 2 W MHz channels show that an operating channel is formed at the center of each available TV channel. That is, it may be set not to form an operating channel over boundaries of the TV channels. In this case, even considering that a start location of available TV channels is changed, elements included in a universal set of 2 W MHz channels may have non-overlapping channel bands.

The 4 W MHz channel may be defined as a channel formed by bonding two 2 W channels. That is, the 4 W MHz channel of FIG. 9 corresponds to a non-contiguous 4 W MHz channel, and may be referred to as a 2 W+2 W MHz channel. Although an example of non-contiguous 4 W MHz is illustrated in FIG. 9 for clarity, a 4 W MHz operating channel may not be defined separately in actual channelization and may be defined to be formed by bonding two 2 W MHz channels.

Figure 10:
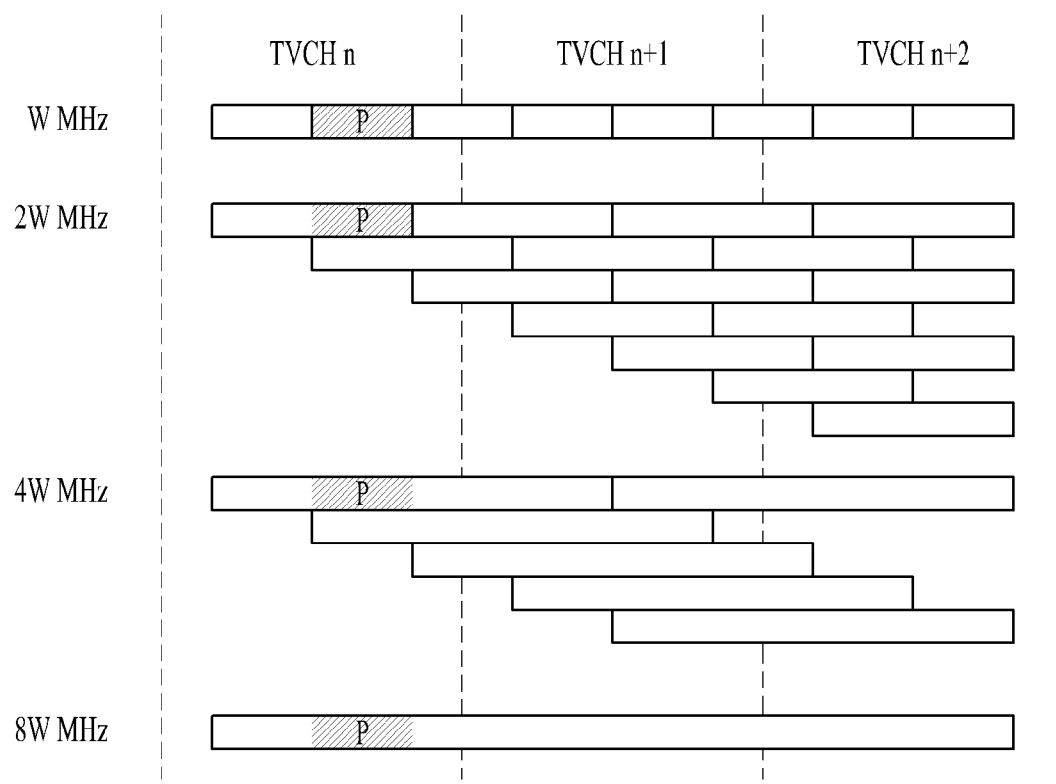

FIG. 10 illustrates an example of channelization according to the present invention in a case in which three contiguous TV channels are available. For example, it is assumed that TV channels n, n+1, and n+2 are available. In this case, operating channels having sizes of W MHz, 2 W MHz, 4 W MHz, and 8 W MHz may be formed. As illustrated in FIG. 10, eight W MHz channels, four 2 W MHz channels, two 4 W MHz channels, and one 8 W MHz channel may be basically defined (if an offset is not considered).

FIG. 10 also illustrates channelization schemes in which various offsets (i.e., various offsets described above in relation to FIG. 8(b)) are applied to the 2 W MHz channels or the 4 W MHz channels. Although examples about all possible offset values are not illustrated in the drawings after FIG. 10 for clarity, this does not mean to exclude application of those offset values.

As illustrated in FIG. 10, according to an offset applied in consideration of a change in the start location of available TV channels, elements included in a universal set of operating channels for the 2 W MHz channels or the 4 W MHz channels may have partially overlapping bands.

Figure 11:
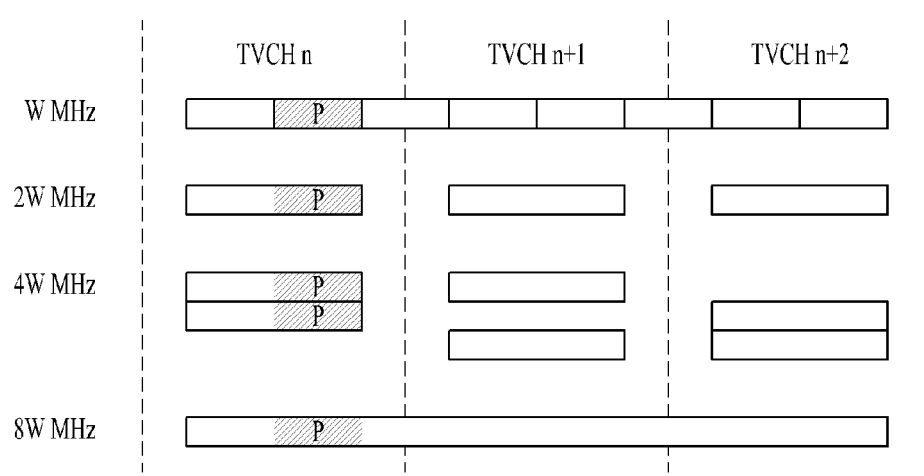

FIG. 11 illustrates another example of channelization according to the present invention in a case in which three contiguous TV channels are available. For example, it is assumed that TV channels n, n+1, and n+2 are available. In this case, operating channels having sizes of W MHz, 2 W MHz, 4 W MHz, and 8 W MHz may be formed. As illustrated in FIG. 11, eight W MHz channels, three 2 W MHz channels, one 4 W MHz channel, and one 8 W MHz channel may be basically defined.

The 2 W MHz channels show that an operating channel is formed at the center of each available TV channel. In this case, even considering that a start location of available TV channels is changed, elements included in a universal set of 2 W MHz channels may have non-overlapping channel bands.

The 4 W MHz channel may be defined as a channel formed by bonding two 2 W channels. The 4 W MHz channel of FIG. 11 corresponds to a non-contiguous 4 W MHz channel (i.e., 2 W+2 W MHz channel). FIG. 11 illustrates three different schemes for forming a 4 W MHz channel by bonding two of three 2 W MHz channels defined when three TV channels are available. Although an example of non-contiguous 4 W MHz is illustrated in FIG. 11 for clarity, a 4 W MHz operating channel may not be defined separately in actual channelization and may be defined to be formed by bonding two 2 W MHz channels.

Figure 12:
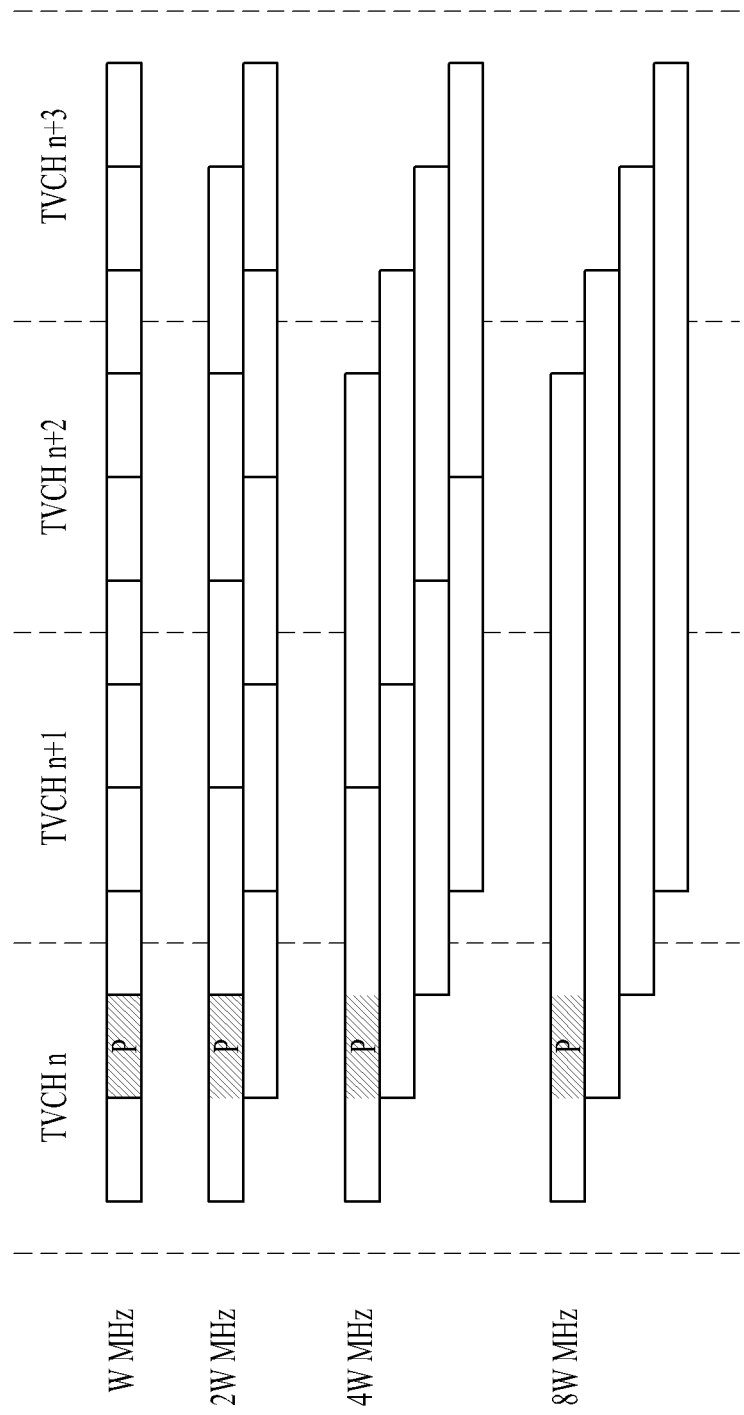

FIG. 12 illustrates an example of channelization according to the present invention in a case in which four contiguous TV channels are available. For example, it is assumed that TV channels n, n+1, n+2, and n+3 are available. In this case, operating channels having sizes of W MHz, 2 W MHz, 4 W MHz, and 8 W MHz may be formed. As illustrated in FIG. 12, eleven W MHz channels, five 2 W MHz channels, two 4 W MHz channels, and one 8 W MHz channel may be basically defined (if an offset is not considered).

FIG. 12 also illustrates channelization schemes in which various offsets are applied to the 2 W MHz channels, the 4 W MHz channels, or the 8 W MHz channel. Although examples about all possible offset values are not illustrated in the drawings after FIG. 10 for clarity, this does not mean to exclude application of those offset values.

As illustrated in FIG. 12, according to an offset applied in consideration of a change in the start location of available TV channels, elements included in a universal set of operating channels for the 2 W MHz channels, the 4 W MHz channels, or the 8 W MHz channel may have partially overlapping bands.

Figure 13:
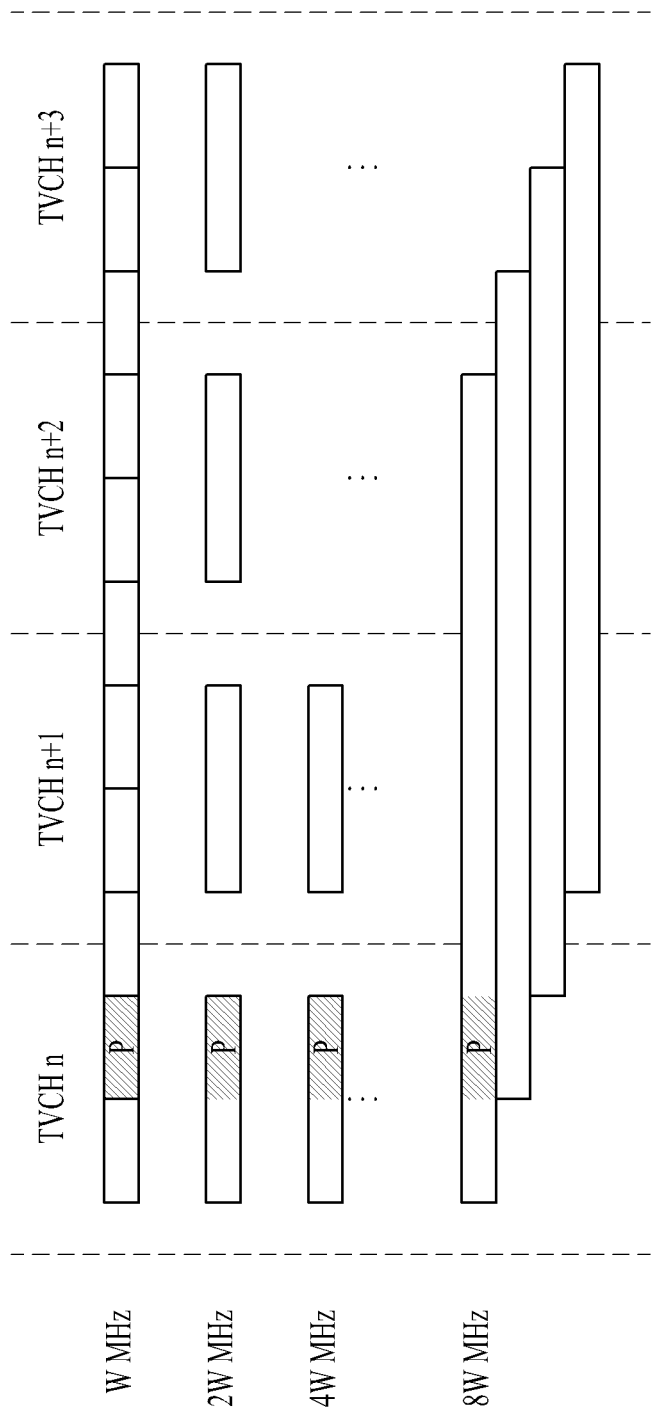

FIG. 13 illustrates another example of channelization according to the present invention in a case in which four contiguous TV channels are available. For example, it is assumed that TV channels n, n+1, n+2, and n+3 are available. In this case, operating channels having sizes of W MHz, 2 W MHz, 4 W MHz, and 8 W MHz may be formed. As illustrated in FIG. 13, eleven W MHz channels, four 2 W MHz channels, one 4 W MHz channel, and one 8 W MHz channel may be basically defined.

The 2 W MHz channels show that an operating channel is formed at the center of each available TV channel. In this case, even considering that a start location of available TV channels is changed, elements included in a universal set of 2 W MHz channels may have non-overlapping channel bands.

The 4 W MHz channel may be defined as a channel formed by bonding two 2 W channels. The 4 W MHz channel of FIG. 13 corresponds to a non-contiguous 4 W MHz channel (i.e., 2 W+2 W MHz channel). FIG. 13 illustrates only one scheme for forming a 4 W MHz channel by bonding two of four 2 W MHz channels defined when four TV channels are available. However, the scheme is not limited thereto and the 4 W MHz channel may be formed according to 6 ($=_4C_2$) schemes for combining two among four. Although an example of non-contiguous 4 W MHz is illustrated in FIG. 13 for clarity, a 4 W operating channel may not be defined separately in actual channelization and may be defined to be formed by bonding two 2 W MHz channels.

FIG. 13 also illustrates channelization schemes in which various offsets are applied to the 8 W MHz channel. As illustrated in FIG. 13, according to an offset applied in consideration of a change in the start location of available TV channels, elements included in a universal set of operating channels for the 8 W MHz channel may have partially overlapping bands.

Figure 14:
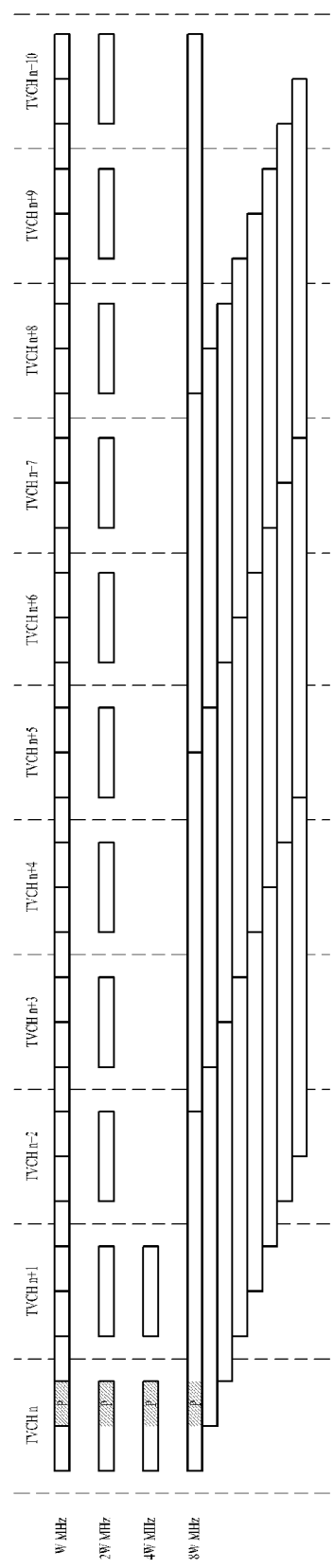

FIG. 14 illustrates an example of channelization according to the present invention in a case in which eleven contiguous TV channels are available. For example, it is assumed that TV channels n, n+1, n+2, . . . , n+10 are available. In this case, operating channels having sizes of W MHz, 2 W MHz, 4 W MHz, and 8 W MHz may be formed. As illustrated in FIG. 14, thirty two W MHz channels, eleven 2 W MHz channels, one 4 W MHz channel, and four 8 W MHz channels may be basically defined.

The 2 W MHz channels show that an operating channel is formed at the center of each available TV channel. In this case, even considering that a start location of available TV channels is changed, elements included in a universal set of 2 W MHz channels may have non-overlapping channel bands.

The 4 W MHz channel may be defined as a channel formed by bonding two 2 W channels. The 4 W MHz channel of FIG. 14 corresponds to a non-contiguous 4 W MHz channel (i.e., 2 W+2 W MHz channel). FIG. 14 illustrates only one scheme for forming a 4 W MHz channel by bonding two of eleven 2 W MHz channels defined when eleven TV channels are available. However, the scheme is not limited thereto and the 4 W MHz channel may be formed according to 55 $(=_{11}C_2)$ schemes for combining two among eleven. Although an example of non-contiguous 4 W MHz is illustrated in FIG. 14 for clarity, a 4 W MHz operating channel may not be defined separately in actual channelization and may be defined to be formed by bonding two 2 W MHz channels.

FIG. 14 also illustrates channelization schemes in which various offsets are applied to the 8 W MHz channel. As illustrated in FIG. 14, according to an offset applied in consideration of a change in the start location of available TV channels, elements included in a universal set of operating channels for the 8 W MHz channel may have partially overlapping bands.

FIG. 14 exemplarily shows a case in which a start location of an operating channel is a frequency spaced apart from each TV channel boundary by 1 MHz, but the scope of the present invention is not limited thereto. For example, a start frequency of the 8 W MHz operating channel of FIG. 14 may be defined to be spaced apart from each TV channel boundary by 2, 3, 4, or 5 MHz. As such, frequency resources specified by available TV channels may be used more efficiently.

Embodiment 1-2

Embodiment 1-2 relates to a case in which a minimum operating channel bandwidth W=4 MHz.

Figure 15:
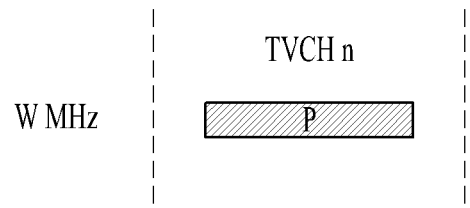

FIG. 15 illustrates an example of channelization according to the present invention in the case in which one TV channel is available. FIG. 15 exemplarily shows a case in which an operating channel is formed as W MHz (e.g., 4 MHz).

In FIG. 15, P denotes a primary channel. One of channels having a minimum channel bandwidth (4 MHz in the current embodiment) may be defined as the primary channel. A channel having a bandwidth greater than the minimum channel bandwidth may be defined to include the primary channel. That is, in FIG. 15, one W MHz channel is present and thus the primary channel itself corresponds to an operating channel.

Figure 16:
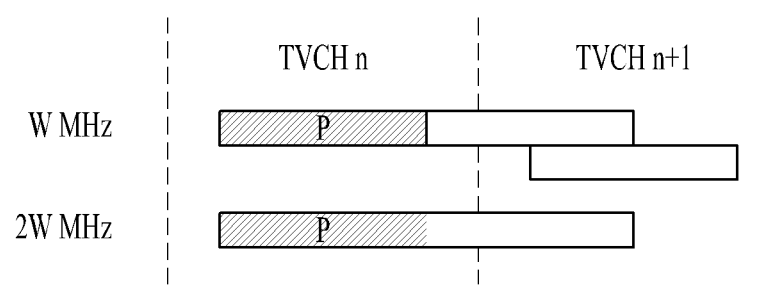

FIG. 16 illustrates an example of channelization according to the present invention in a case in which two contiguous TV channels are available. For example, it is assumed that TV channels n and n+1 are available. In this case, operating channels having sizes of W MHz and 2 W MHz may be formed. As illustrated in FIG. 16, two W MHz channels and one 2 W MHz channel may be defined (if an offset is not considered).

In FIG. 16, a primary channel may be defined as a channel having a size of W and not including a TV channel boundary. In addition, if primary channels are located at the same location in the W MHz and 2 W MHz channels as illustrated in FIG. 16, CCA may be performed efficiently.

FIG. 16 exemplarily shows a case in which an offset is applied to the W channel in consideration of a change in the start location of available TV channels. In this case, elements included in a universal set of operating channels may have partially overlapping bands.

Figure 17:
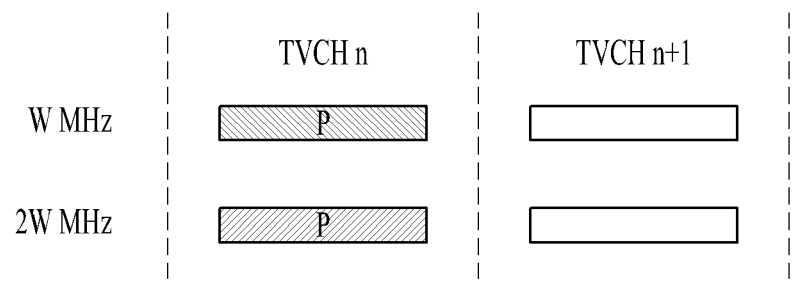

FIG. 17 illustrates another example of channelization according to the present invention in a case in which two contiguous TV channels are available. For example, it is assumed that TV channels n and n+1 are available. In this case, operating channels having sizes of W MHz and 2 W MHz may be formed. As illustrated in FIG. 17, two W MHz channels and one 2 W MHz channel may be defined.

The W MHz channels may be channelized as described above in relation to FIG. 16 and thus repeated descriptions thereof are not provided here.

The W MHz channels show that an operating channel is formed at the center of each available TV channel. That is, it may be set not to form an operating channel over boundaries of the TV channels. In this case, even considering that a start location of available TV channels is changed, elements included in a universal set of W MHz channels may have non-overlapping channel bands.

The 2 W MHz channel may be defined as a channel formed by bonding two W channels. That is, the 2 W MHz channel of FIG. 17 corresponds to a non-contiguous 2 W MHz channel, and may be referred to as a W+W MHz channel. Although an example of non-contiguous 2 W MHz is illustrated in FIG. 17 for clarity, a 2 W MHz operating channel may not be defined separately in actual channelization and may be defined to be formed by bonding two W MHz channels.

Figure 18:
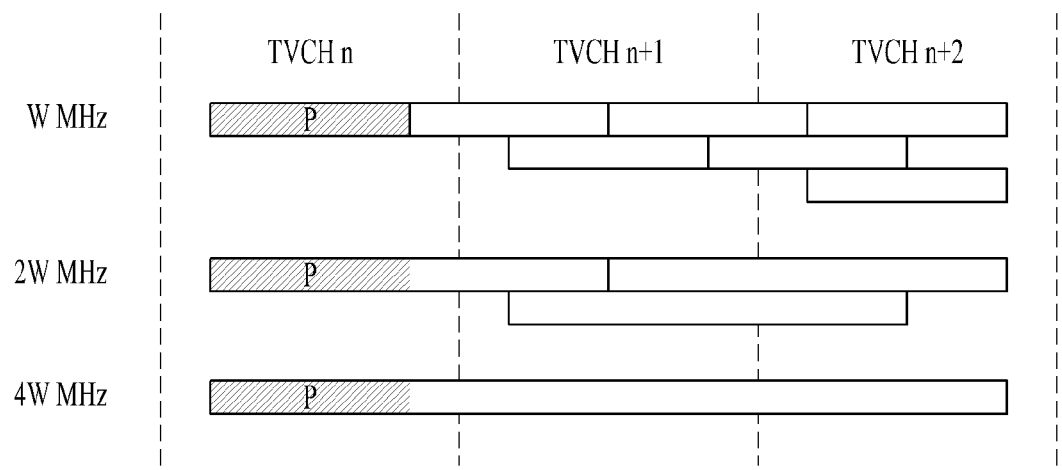

FIG. 18 illustrates an example of channelization according to the present invention in a case in which three contiguous TV channels are available. For example, it is assumed that TV channels n, n+1, and n+2 are available. In this case, operating channels having sizes of W MHz, 2 W MHz, and 4 W MHz may be formed. As illustrated in FIG. 18, four W MHz channels, two 2 W MHz channels, and one 4 W MHz channels may be basically defined (if an offset is not considered).

FIG. 18 also illustrates channelization schemes in which various offsets are applied to the W MHz channels or the 2 W MHz channels. FIG. 18 exemplarily shows an offset applied in consideration of a change in the start location of available TV channels. In this case, elements included in a universal set of operating channels may have partially overlapping bands.

Figure 19:
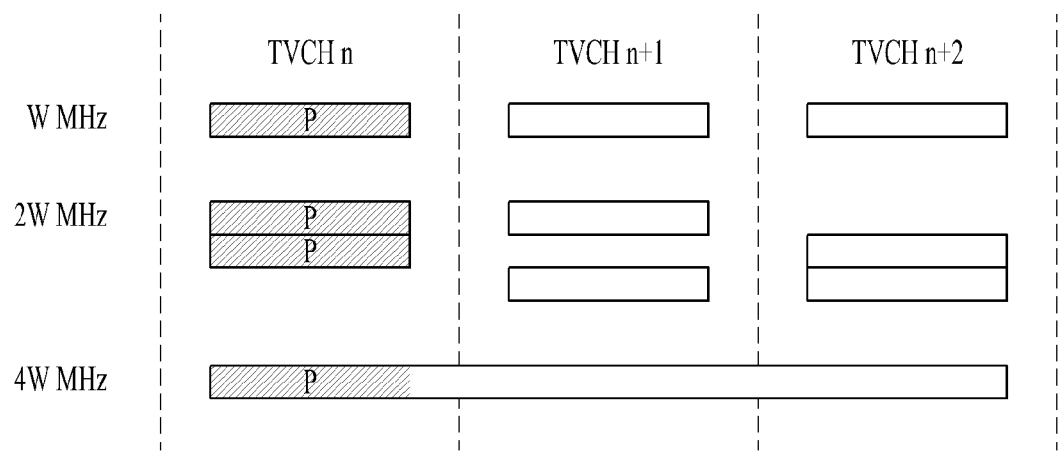

FIG. 19 illustrates another example of channelization according to the present invention in a case in which three contiguous TV channels are available. For example, it is assumed that TV channels n, n+1, and n+2 are available. In this case, operating channels having sizes of W MHz, 2 W MHz, and 4 W MHz may be formed. As illustrated in FIG. 19, three W MHz channels, one 2 W MHz channel, and one 4 W MHz channel may be basically defined.

The W MHz channels show that an operating channel is formed at the center of each available TV channel. In this case, even considering that a start location of available TV channels is changed, elements included in a universal set of W MHz channels may have non-overlapping channel bands.

The 2 W MHz channel may be defined as a channel formed by bonding two W channels. The 2 W MHz channel of FIG. 19 corresponds to a non-contiguous 2 W MHz channel (i.e., W+W MHz channel). FIG. 19 illustrates three different schemes for forming a 2 W MHz channel by bonding two of three W MHz channels defined when three TV channels are available. Although an example of non-contiguous 2 W MHz is illustrated in FIG. 19 for clarity, a 2 W MHz operating channel may not be defined separately in actual channelization and may be defined to be formed by bonding two W MHz channels.

Figure 20:
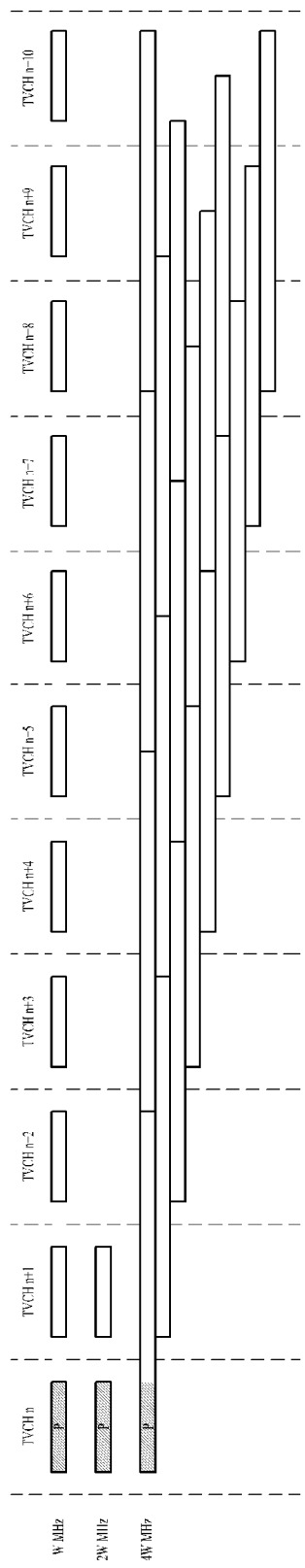

FIG. 20 illustrates an example of channelization according to the present invention in a case in which eleven contiguous TV channels are available. For example, it is assumed that TV channels n, n+1, n+2, . . . , n+10 are available. In this case, operating channels having sizes of W MHz, 2 W MHz, and 4 W MHz may be formed.

The W MHz channels show that an operating channel is formed at the center of each available TV channel. In this case, even considering that a start location of available TV channels is changed, elements included in a universal set of W MHz channels may have non-overlapping channel bands.

Eleven W channels may be basically defined. That is, one W channel may be defined for each of the eleven TV channels (TVCH n to n+10). Each W channel may be located at the center of the corresponding TV channel. This corresponds to a universal set of W channels, and an actual operating channel may include a few or all elements selected from the universal set.

For example, among all eleven W channels respectively located at the center of the eleven contiguous TV channels, one W channel on one TV channel (e.g., TVCH n+5) may be set as an operating channel. Alternatively, two W channels on two contiguous TV channels (e.g., TVCH n+5 and TVCH n+6) may be set as an operating channel. Alternatively, four W channels on four contiguous TV channels (e.g., TVCH n+3, TVCH n+4, TVCH n+5, and TVCH n+6) may be set as an operating channel. Alternatively, two W channels on two non-contiguous TV channels (e.g., TVCH n+5 and TVCH n+7) may be set as an operating channel. Alternatively, two non-contiguous frequency sections each including two W MHz channels on two contiguous available TV channel (e.g., TVCH n+1 and TVCH n+2, and TVCH n+5 and TVCH n+6) may be set as an operating channel.

The 2 W MHz channel may be defined as a channel formed by bonding two W channels. The 2 W MHz channel of FIG. 20 corresponds to a non-contiguous 2 W MHz channel (i.e., W+W MHz channel). FIG. 20 illustrates only one scheme for forming a 2 W MHz channel by bonding two of eleven W MHz channels defined when eleven TV channels are available. However, the scheme is not limited thereto and the 2 W MHz channel may be formed according to 55 ($=_{11}C_2$) schemes for combining two among eleven.

Although an example of non-contiguous 2 W MHz is illustrated in FIG. 20 for clarity, a 2 W MHz operating channel may not be defined separately in actual channelization and may be defined to be formed by bonding two W MHz channels.

FIG. 20 also illustrates channelization schemes in which various offsets are applied to the 4 W MHz channel. As illustrated in FIG. 20, according to an offset applied in consideration of a change in the start location of available TV channels, elements included in a universal set of operating channels for the 4 W MHz channel may have partially overlapping bands.

FIG. 20 exemplarily shows a case in which a start location of an operating channel is a frequency spaced apart from each TV channel boundary by 1 MHz, but the scope of the present invention is not limited thereto. For example, a start frequency of the 4 W MHz operating channel of FIG. 20 may be defined to be spaced apart from each TV channel boundary by 2, 3, 4, or 5 MHz. As such, frequency resources specified by available TV channels may be used more efficiently.

Figure 21:
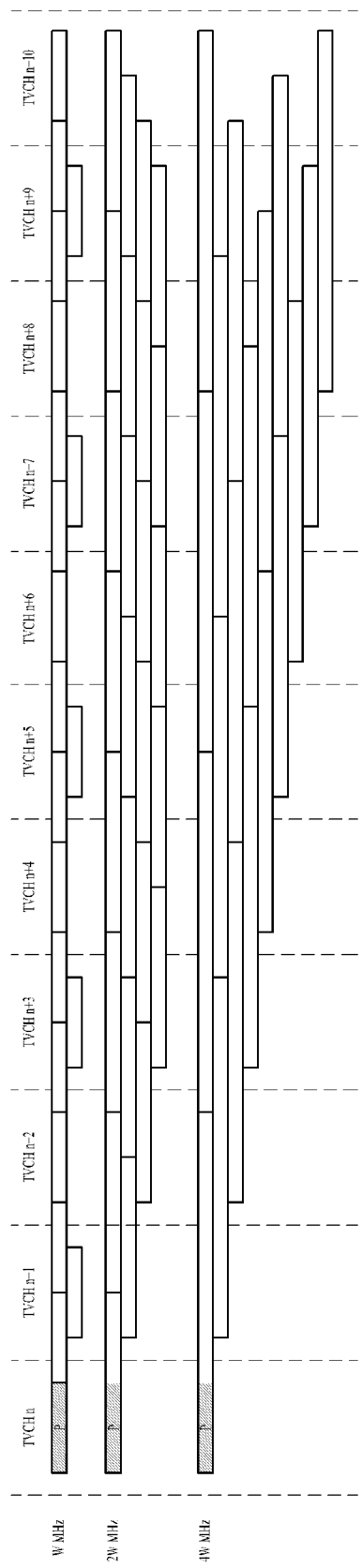

FIG. 21 illustrates another example of channelization according to the present invention in a case in which eleven contiguous TV channels are available. For example, it is assumed that TV channels n, n+1, n+2, . . . , n+10 are available. In this case, operating channels having sizes of W MHz, 2 W MHz, and 4 W MHz may be formed.

The W MHz channels show that an operating channel is formed at the center of each available TV channel. In this case, even considering that a start location of available TV channels is changed, elements included in a universal set of W MHz channels may have non-overlapping channel bands.

FIG. 21 also illustrates channelization schemes in which various offsets are applied. As illustrated in FIG. 21, according to an offset applied in consideration of a change in the start location of available TV channels, elements included in a universal set of operating channels for the W MHz channels, the 2 W MHz channels, or the 4 W MHz channels may have partially overlapping bands.

FIG. 21 exemplarily shows a case in which a start location of an operating channel is a frequency spaced apart from each TV channel boundary by 1 MHz, but the scope of the present invention is not limited thereto. For example, a start frequency of the 4 W MHz operating channels of FIG. 21 may be defined to be spaced apart from each TV channel boundary by 2, 3, 4, or 5 MHz. As such, frequency resources specified by available TV channels may be used more efficiently.

Embodiment 2

Embodiment 2 relates to a channelization scheme in TVWS in a case in which the bandwidth of TV channels is 8 MHz.

Embodiment 2-1

Embodiment 2-1 relates to a case in which a minimum operating channel bandwidth W=2 MHz.

FIG. 22 illustrates an example of channelization according to the present invention in a case in which one TV channel is available. FIG. 22 exemplarily shows a case in which an operating channel is formed as W MHz (e.g., 2 MHz) when only one TV channel, e.g., TV channel n is available.

FIG. 22(a) illustrates an example of a case in which a start frequency of an operating channel is spaced apart from a start frequency of the available TV channel by 1 MHz. In other words, FIG. 22(a) corresponds to a case in which an offset of 1 MHz is applied to a start location of an operating channel based on a TV channel boundary. In this case, three W MHz channels and one 2 W MHz channel may be defined for one available TV channel.

FIG. 22(b) illustrates an example of a case in which a start frequency of an operating channel is spaced apart from a start frequency of the available TV channel by 2 MHz (i.e., an offset of 2 MHz is applied based on a TV channel boundary). In this case, two W MHz channels and one 2 W MHz channel may be defined for one available TV channel.

FIG. 23 illustrates an example of channelization according to the present invention in a case in which two contiguous TV channels are available. For example, it is assumed that TV channels n and n+1 are available. In this case, operating channels having sizes of W MHz, 2 W MHz, and 4 W MHz may be formed.

As illustrated in FIG. 23(a), five W MHz channels, two 2 W MHz channels, and one 4 W MHz channel may be defined.

FIG. 23(a) illustrates an example of a case in which a start frequency of an operating channel is spaced apart from a start frequency of the available TV channels by 1 MHz (i.e., an offset of 1 MHz is applied based on a TV channel boundary). In this case, seven W MHz channels, three 2 W MHz channels, and one 4 W MHz channel may be defined.

FIG. 23(b) illustrates an example of a case in which a start frequency of an operating channel is spaced apart from a start frequency of the available TV channels by 2 MHz (i.e., an offset of 2 MHz is applied based on a TV channel boundary). In this case, six W MHz channels, three 2 W MHz channels, and one 4 W MHz channel may be defined.

In FIG. 23, a 4 W MHz operating channel may be defined as a channel formed by bonding two 2 W operating channels (i.e., 2 W+2 W channel). In this case, the 4 W MHz operating channel may not be defined separately and may be defined to be formed by bonding two 2 W MHz channels.

Figure 24:
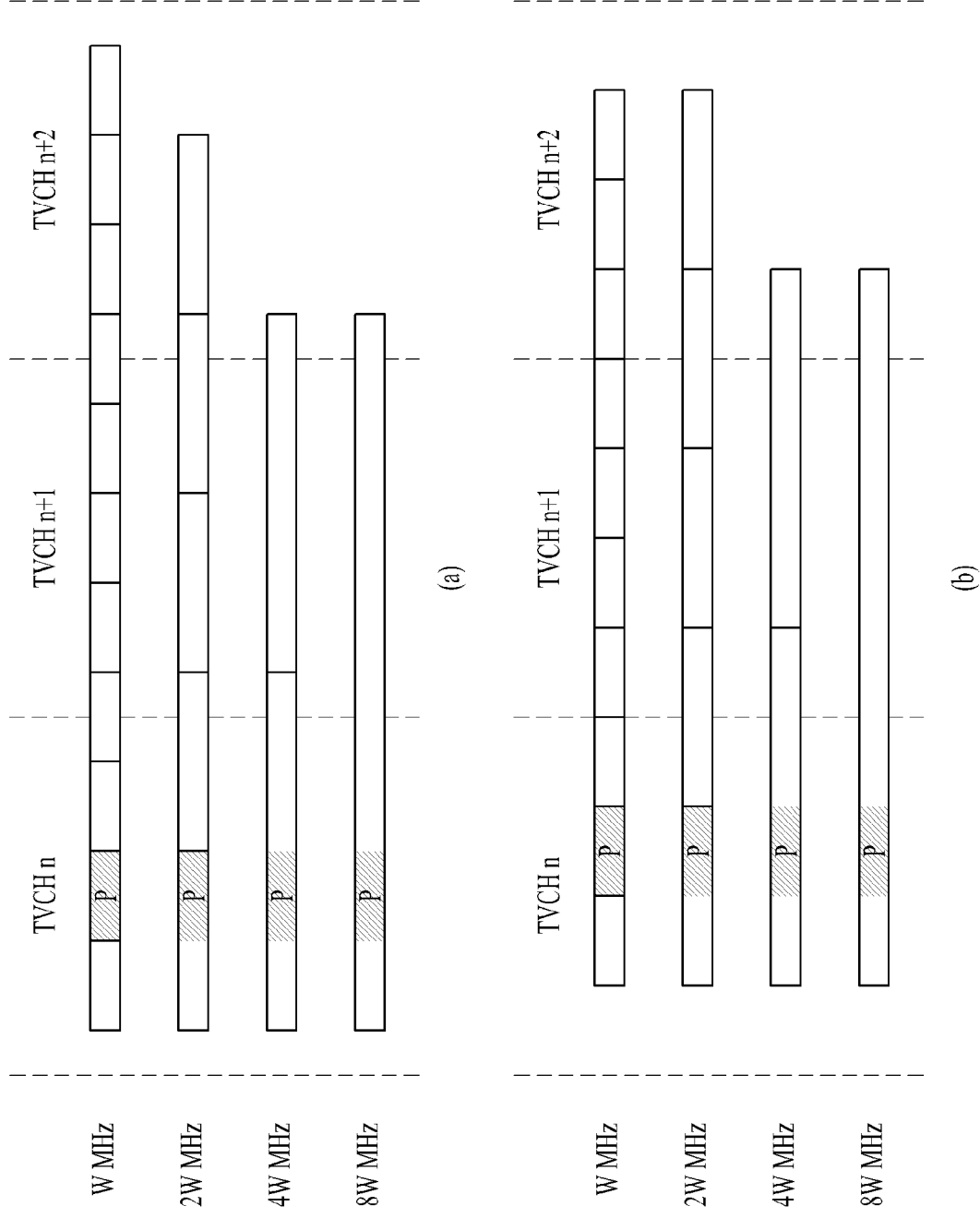

FIG. 24 illustrates an example of channelization according to the present invention in a case in which three contiguous TV channels are available. For example, it is assumed that TV channels n, n+1, and n+2 are available. In this case, operating channels having sizes of W MHz, 2 W MHz, 4 W MHz, and 8 W MHz may be formed.

FIG. 24(a) illustrates an example of a case in which a start frequency of an operating channel is spaced apart from a start frequency of the available TV channels by 1 MHz (i.e., an offset of 1 MHz is applied based on a TV channel boundary). In this case, eleven W MHz channels, five 2 W MHz channels, two 4 W MHz channels, and one 8 W MHz channel may be defined.

FIG. 24(b) illustrates an example of a case in which a start frequency of an operating channel is spaced apart from a start frequency of the available TV channels by 2 MHz (i.e., an offset of 2 MHz is applied based on a TV channel boundary). In this case, ten W MHz channels, five 2 W MHz channels, two 4 W MHz channels, and one 8 W MHz channel may be defined.

In FIG. 24, a 4 W MHz operating channel may be defined as a channel formed by bonding two 2 W operating channels (i.e., 2 W+2 W channel). In this case, the 4 W MHz operating channel may not be defined separately and may be defined to be formed by bonding two 2 W MHz channels.

Figure 25:
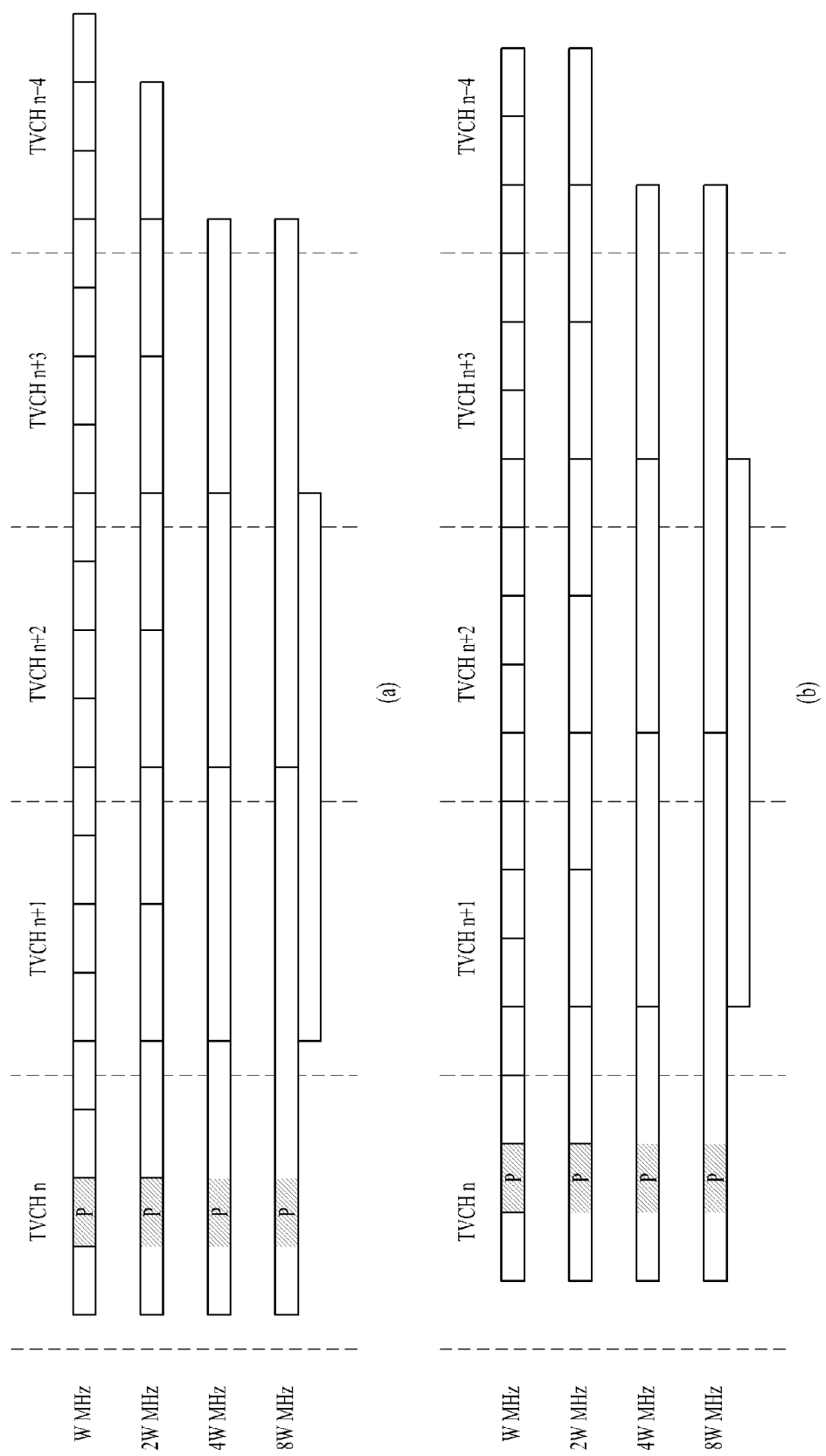

FIG. 25 illustrates an example of channelization according to the present invention in a case in which five contiguous TV channels are available. For example, it is assumed that TV channels n, n+1, n+2, n+3, and n+4 are available. In this case, operating channels having sizes of W MHz, 2 W MHz, 4 W MHz, and 8 W MHz may be formed.

FIG. 25(a) illustrates an example of a case in which a start frequency of an operating channel is spaced apart from a start frequency of the available TV channels by 1 MHz (i.e., an offset of 1 MHz is applied based on a TV channel boundary). In this case, nineteen W MHz channels, nine 2 W MHz channels, four 4 W MHz channels, and two 8 W MHz channels may be defined.

FIG. 25(b) illustrates an example of a case in which a start frequency of an operating channel is spaced apart from a start frequency of the available TV channels by 2 MHz (i.e., an offset of 2 MHz is applied based on a TV channel boundary). In this case, eighteen W MHz channels, nine 2 W MHz channels, four 4 W MHz channels, and two 8 W MHz channels may be defined.

In FIG. 25, a 4 W MHz operating channel may be defined as a channel formed by bonding two 2 W operating channels (i.e., 2 W+2 W channel). In this case, the 4 W MHz operating channel may not be defined separately and may be defined to be formed by bonding two 2 W MHz channels.

FIG. 25 exemplarily shows a case in which a start frequency of a 8 W MHz operating channel is spaced apart from the start frequency of the available TV channels by 1 MHz or 2 MHz, but the scope of the present invention is not limited thereto. For example, the 8 W MHz operating channel may be defined to be started at a frequency spaced apart from a TV channel boundary by 2, 3, 4, 5, 6, or 7 MHz. As such, frequency resources specified by available TV channels may be used more efficiently.

Embodiment 2-2

Embodiment 2-2 relates to a case in which a minimum operating channel bandwidth W=4 MHz.

Figure 26:
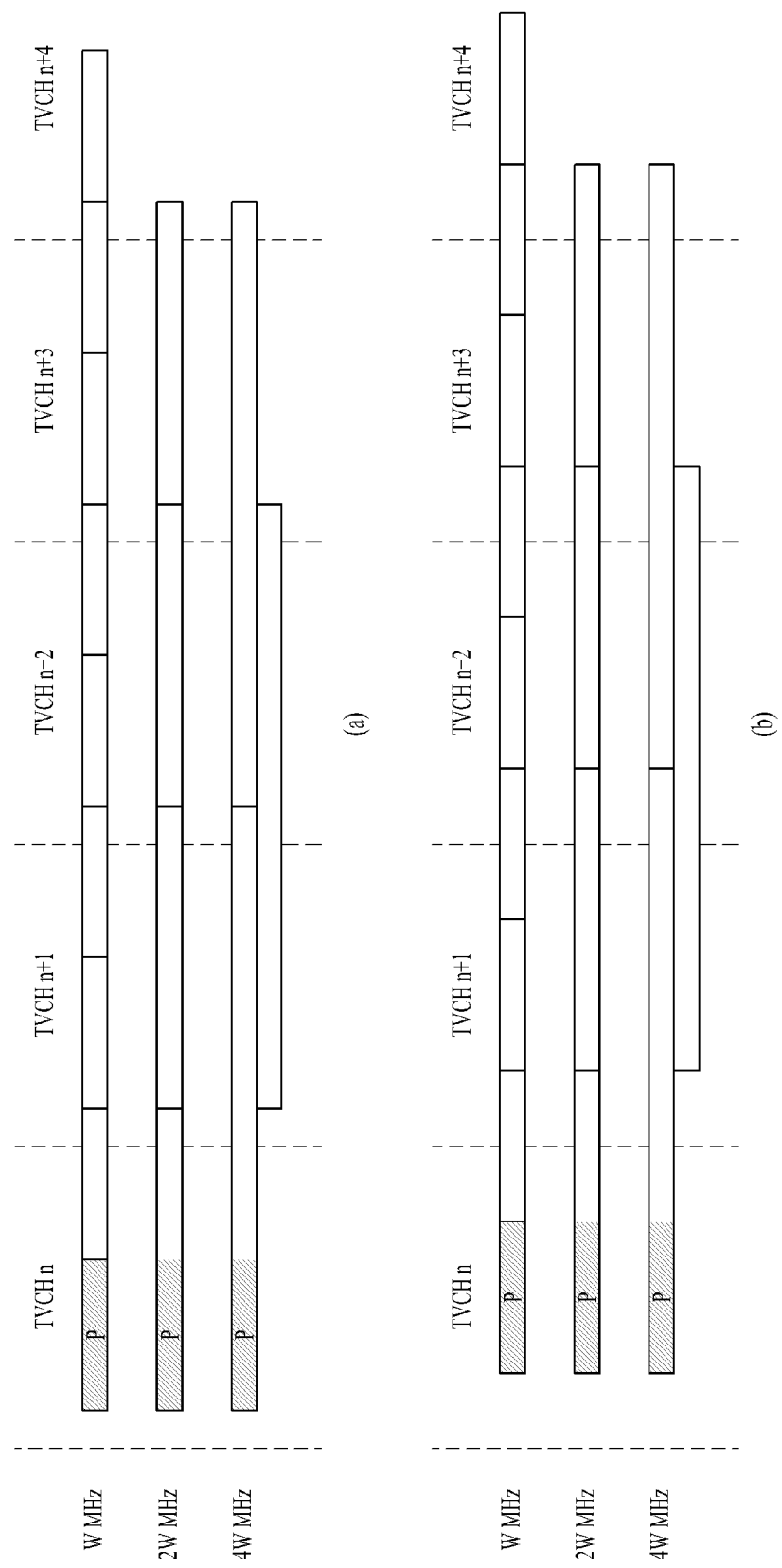

FIG. 26 illustrates another example of channelization according to the present invention in a case in which five contiguous TV channels are available. For example, it is assumed that TV channels n, n+1, n+2, n+3, and n+4 are available. In this case, operating channels having sizes of W MHz, 2 W MHz, and 4 W MHz (e.g., 4 MHz, 8 MHz, and 16 MHz operating channels) may be formed.

FIG. 26(a) illustrates an example of a case in which a start frequency of an operating channel is spaced apart from a start frequency of the available TV channels by 1 MHz (i.e., an offset of 1 MHz is applied based on a TV channel boundary). In this case, nine W MHz channels, four 2 W MHz channels, and two 4 W MHz channels may be defined.

FIG. 26(b) illustrates an example of a case in which a start frequency of an operating channel is spaced apart from a start frequency of the available TV channels by 2 MHz (i.e., an offset of 2 MHz is applied based on a TV channel boundary). In this case, nine W MHz channels, four 2 W MHz channels, and two 4 W MHz channels may be defined.

In FIG. 26, a 2 W MHz operating channel may be defined as a channel formed by bonding two W operating channels (i.e., W+W channel). In this case, the 2 W MHz operating channel may not be defined separately and may be defined to be formed by bonding two W MHz channels.

FIG. 26 exemplarily shows a case in which a start frequency of a 4 W MHz operating channel is spaced apart from the start frequency of the available TV channels by 1 MHz or 2 MHz, but the scope of the present invention is not limited thereto. For example, the 4 W MHz operating channel may be defined to be started at a frequency spaced apart from a TV channel boundary by 2, 3, 4, 5, 6, or 7 MHz.

As such, frequency resources specified by available TV channels may be used more efficiently.

Figure 27:
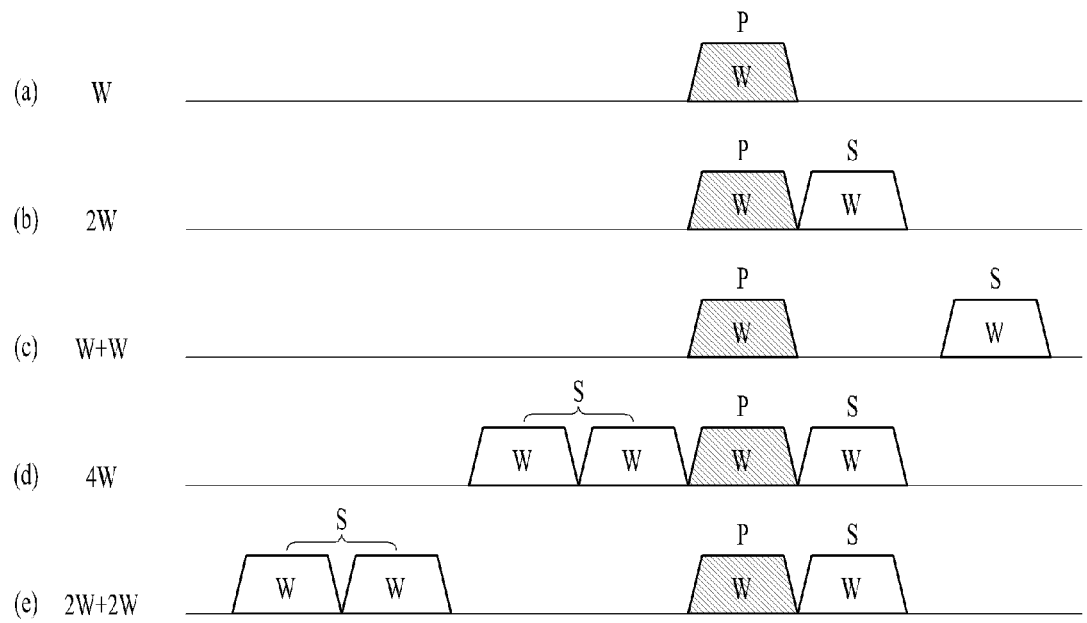
FIG. 27 illustrates exemplary structures of an operating channel in TV white space (TVWS), according to an embodiment of the present invention.

FIG. 27 illustrates exemplary structures of an operating channel in TVWS, according to an embodiment of the present invention. The exemplary structures of FIG. 27 may be summarized from the examples described above in relation to FIGS. 7 to 26.

FIG. 27(a) illustrates a case in which an operating channel is formed of one W channel. This may be referred to as a W operating channel width. In this case, one W channel may correspond to a primary W channel.

FIG. 27(b) illustrates a case in which an operating channel is formed of two contiguous W channels. This may be referred to as a 2 W operating channel width. In this case, one of the two W channels may correspond to a primary W channel, and the other of the two W channels may correspond to a secondary W channel.

FIG. 27(c) illustrates a case in which an operating channel is formed of two non-contiguous W channels. This may be referred to as a W+W operating channel width. In this case, one of the two W channels may correspond to a primary W channel, and the other of the two W channels may correspond to a secondary W channel.

FIG. 27(d) illustrates a case in which an operating channel is formed of four contiguous W channels. This may be referred to as a 4 W operating channel width. In this case, one of the four W channels may correspond to a primary W channel, and the other three of the four W channels may correspond to secondary W channels. Here, the three secondary W channels may correspond to one secondary W channel and one secondary 2 W channel.

FIG. 27(e) illustrates a case in which an operating channel is formed of two non-contiguous frequency sections each including two contiguous W channels. This may be referred to as a 2 W+2 W operating channel width. In this case, one of the four W channels may correspond to a primary W channel, and the other three of the four W channels may correspond to secondary W channels. Here, the three secondary W channels may correspond to one secondary W channel and one secondary 2 W channel.

In the various exemplary structures of the operating channels of FIGS. 27(a) to 27 (e), primary channels set in consideration of available TV channels of TVWS are set to the same frequency location according to the proposal of the present invention.

The above-described various embodiments of the present invention may be applied independently or in combination of two or more embodiments.

Figure 28:
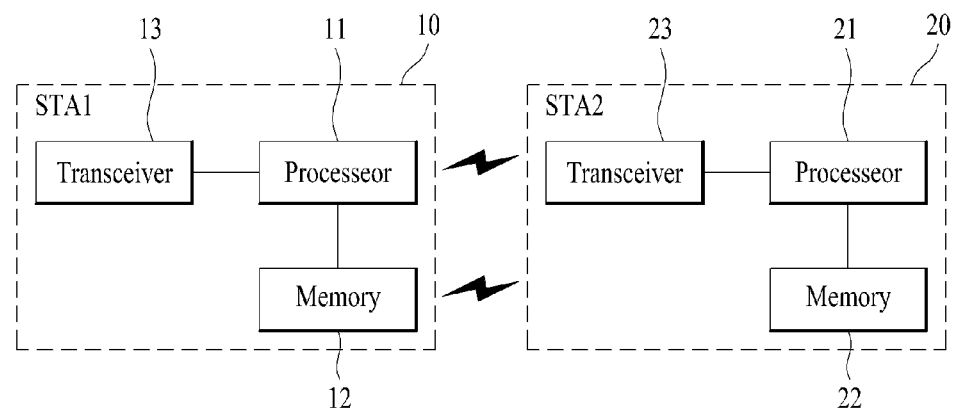
FIG. 28 is a block diagram of transceiver devices according to an embodiment of the present invention.

FIG. 28 is a block diagram of wireless devices according to an embodiment of the present invention.

A first STA 10 may include a processor 11, a memory 12 and a transceiver 13. A second STA 20 may include a processor 21, a memory 22 and a transceiver 23. The transceiver 13 or 23 may transmit/receive radio signals and implement a physical layer according to, for example, the IEEE 802 system. The processor 11 or 21 may be connected to the transceiver 13 or 23 to implement the physical layer and/or an MAC layer according to the IEEE 802 system. The processor 11 or 21 may be configured to perform operations according to the above-described embodiments of the present invention. Modules for implementing operations of the first STA 10 or the second STA 20 according to the above-described embodiments of the present invention may be stored in the memory 12 or 22 and executed by the processor 11 or 21. The memory 12 or 22 may be included in the processor 11 or 21, or may be installed outside and connected to the processor 11 or 21 through known means.

The first STA 10 according to an embodiment of the present invention may be configured to set an operating channel for the second STA 20 in a white space band. The processor 11 of the first STA 10 may be configured to acquire information about available TV channels from a GDB using the transceiver 13. The processor 11 of the first STA 10 may also be configured to transmit setting information of the operating channel determined based on the information about the available TV channels, to the second STA 20 using the transceiver 13.

The second STA 20 according to an embodiment of the present invention may be configured to set an operating channel for the first STA 10 in a white space band. The processor 21 of the second STA 20 may be configured to receive the setting information of the operating channel determined based on the information about the available TV channels, from the first STA 10 using the transceiver 23. The processor 21 of the second STA 20 may also be configured to determine the location of the operating channel based on the setting information of the operating channel.

Here, the operating channel may be defined to be located at a location spaced apart from a channel start frequency by a certain frequency. The setting information of the operating channel transmitted from the first STA 10 to the second STA 20 may include at least information used to determine the certain frequency.

The above-described configurations of the first STA 10 and the second STA 20 may be implemented in such a manner that the above-described various embodiments of the present invention are applied independently or in combination of two or more embodiments, and repeated descriptions thereof are not provided here for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. for performing the above-described functions or operations. For example, software code may be stored in a memory unit and executed by a processor. The memory unit is located inside or outside the processor and may exchange data with the processor using various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention focus on the IEEE 802.11 system, but may also be applicable to various mobile communication systems in the same manner.

The invention claimed is:

1. A method for setting an operating channel for a second station (STA) in a white space band by a first STA, the method comprising:
   acquiring information on available TV channels from a geo-location database (GDB); and
   transmitting, to the second STA, setting information of the operating channel being determined based on the information on the available TV channels,
   wherein, if a minimum channel bandwidth supported by the operating channel is W MHz, the operating channel is defined to have one or more channel widths among:
   a) one W MHz channel width,
   b) two contiguous W MHz channel widths,
   c) four contiguous W MHz channel widths,
   d) two non-contiguous W MHz channel widths, and
   e) two non-contiguous frequency sections each comprising two contiguous W MHz channels,
   wherein the operating channel is defined at a location spaced apart from a channel start frequency by a predetermined frequency, and
   wherein the predetermined frequency, corresponding to a distance between the location and the channel start frequency, is set based on the minimum channel bandwidth supported by the operating channel (W) multiplied by a channel index.

2. The method according to claim 1, wherein the setting information of the operating channel comprises information about the predetermined frequency.

3. The method according to claim 1, wherein the channel start frequency is a frequency of a first channel of the available TV channels.

4. The method according to claim 1, wherein the operating channel is spaced apart from a boundary of the available TV channels by a band equal to or greater than a predetermined guard band.

5. The method according to claim 1, wherein a location of the operating channel is defined by a location of a primary channel having a size of W MHz.

6. The method according to claim 5, wherein the primary channel for each of the operating channels having the channel widths of a) to e) are set to the same frequency location.

7. The method according to claim 5, wherein clear channel assessment (CCA) is performed using the primary channel on each of the operating channel having the channel width of a) to e).

8. The method according to claim 1, wherein the first STA is an enabling STA, and wherein the second STA is a dependent STA.

9. The method according to claim 1, wherein the operating channel is defined as one or more of a) one W MHz channel on one available TV channel, b) two W MHz channels on two contiguous available TV channels, c) four W MHz channels on four contiguous available TV channels, d) two W MHz channels on two non-contiguous available TV channels, and e) two non-contiguous frequency sections each comprising two W MHz channels on two contiguous available TV channels.

10. A method for receiving setting information of an operating channel in a white space band from a first station (STA) by a second STA, the method comprising:
    receiving, from the first STA, the setting information of the operating channel being determined based on information on available TV channels; and
    determining a location of the operating channel based on the setting information of the operating channel,
    wherein, if a minimum channel bandwidth supported by the operating channel is W MHz, the operating channel is defined to have one or more channel widths among:
    a) one W MHz channel width,
    b) two contiguous W MHz channel widths,
    c) four contiguous W MHz channel widths,
    d) two non-contiguous W MHz channel widths, and
    e) two non-contiguous frequency sections each comprising two contiguous W MHz channels,
    wherein the operating channel is defined at a location spaced apart from a channel start frequency by a predetermined frequency, and
    wherein the predetermined frequency, corresponding to a distance between the location and the channel start frequency, is set based on the minimum channel bandwidth supported by the operating channel (W) multiplied by a channel index.

11. A first station (STA) for setting an operating channel for a second STA in a white space band, the first STA comprising:
    a transceiver configured to transmit signals to and receive signals from other devices; and
    a processor configured to:
    control the first STA comprising the transceiver;
    acquire information on available TV channels from a geo-location database (GDB), using the transceiver; and
    transmit setting information of the operating channel being determined based on the information on the available TV channels, using the transceiver to the second STA,
    wherein, if a minimum channel bandwidth supported by the operating channel is W MHz, the operating channel is defined to have one or more channel widths among:
    a) one W MHz channel width,
    b) two contiguous W MHz channel widths,
    c) four contiguous W MHz channel widths,
    d) two non-contiguous W MHz channel widths, and
    e) two non-contiguous frequency sections each comprising two contiguous W MHz channels,
    wherein the operating channel is defined at a location spaced apart from a channel start frequency by a predetermined frequency, and
    wherein the predetermined frequency, corresponding to a distance between the location and the channel start frequency, is set based on the minimum channel bandwidth supported by the operating channel (W) multiplied by a channel index.

12. A second station (STA) for receiving setting information of an operating channel in a white space band from a first STA, the second STA comprising:
    a transceiver configured to transmit signals to and receive signals from other devices; and
    a processor configured to:
    control the second STA comprising the transceiver;
    receive the setting information of the operating channel being determined based on information about available TV channels, using the transceiver from the first STA; and
    determine a location of the operating channel based on the setting information of the operating channel,
    wherein, if a minimum channel bandwidth supported by the operating channel is W MHz, the operating channel is defined to have one or more channel widths among:

a) one W MHz channel width,
b) two contiguous W MHz channel widths,
c) four contiguous W MHz channel widths,
d) two non-contiguous W MHz channel widths, and
e) two non-contiguous frequency sections each comprising two contiguous W MHz channels, wherein the operating channel is defined at a location spaced apart from a channel start frequency by a predetermined frequency, and wherein the predetermined frequency, corresponding to a distance between the location and the channel start frequency, is set based on the minimum channel bandwidth supported by the operating channel (W) multiplied by a channel index.

* * * * *